US012033585B1

(12) United States Patent
Kim et al.

(10) Patent No.: US 12,033,585 B1
(45) Date of Patent: Jul. 9, 2024

(54) SCAN SIGNAL DRIVER AND DISPLAY DEVICE INCLUDING THE SAME

(71) Applicants: Samsung Display Co., LTD., Yongin-si (KR); Konkuk University Industrial Cooperation Corp, Seoul (KR)

(72) Inventors: Kyung Ho Kim, Yongin-si (KR); Yi Kyoung You, Yongin-si (KR); Kee Chan Park, Yongin-si (KR); Sang Yong No, Yongin-si (KR); Gi Chang Lee, Yongin-si (KR)

(73) Assignees: Samsung Display Co., Ltd., Yongin-si (KR); Konkuk University Industrial Cooperation Corp, Seoul (KR)

( * ) Notice: Subject to any disclaimer, the term of this patent is extended or adjusted under 35 U.S.C. 154(b) by 0 days.

(21) Appl. No.: 18/236,862

(22) Filed: Aug. 22, 2023

(30) Foreign Application Priority Data

Dec. 30, 2022 (KR) ........................ 10-2022-0190908

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2310/08* (2013.01); *G09G 2330/028* (2013.01)

(58) Field of Classification Search
CPC ... G09G 3/30-3291; G09G 2310/0286; G09G 2310/0289; G09G 2354/00; G09G 2310/08; G09G 2330/028; G11C 27/04
See application file for complete search history.

(56) References Cited

U.S. PATENT DOCUMENTS

| | | | | |
|---|---|---|---|---|
| 2018/0337682 | A1* | 11/2018 | Takasugi | H03K 21/18 |
| 2020/0074937 | A1* | 3/2020 | Choi | G09G 3/3291 |
| 2020/0135115 | A1* | 4/2020 | Chang | G09G 3/3291 |
| 2020/0202779 | A1* | 6/2020 | Chang | G09G 3/3233 |
| 2021/0335203 | A1* | 10/2021 | Feng | G11C 19/28 |
| 2021/0366400 | A1* | 11/2021 | Feng | G09G 3/3266 |
| 2022/0101796 | A1* | 3/2022 | Feng | G09G 3/3266 |

FOREIGN PATENT DOCUMENTS

| | | | |
|---|---|---|---|
| KR | 2017-0078978 | A | 7/2017 |
| KR | 2020-0026474 | A | 3/2020 |
| KR | 2020-0080323 | A | 7/2020 |
| KR | 2022-0096587 | A | 7/2022 |
| KR | 2022-0096920 | A | 7/2022 |

* cited by examiner

*Primary Examiner* — Roberto W Flores
(74) *Attorney, Agent, or Firm* — Lewis Roca Rothgerber Christie LLP

(57) ABSTRACT

A scan signal driver includes: a plurality of stages configured to be driven by dividing a first frame period into a display period and a sensing period, and to sequentially output scan signals at the display period, wherein each of the plurality of stages comprises: an output control circuit; and a memory control circuit, wherein the scan driver is configured to: irregularly set a specific stage of the plurality of stages at a display period every frame; control the specific stage to: store a voltage by using the memory control circuit; and output a sensing signal by using the stored voltage at a sensing period, and the memory control circuit includes: a second memory transistor configured to electrically connect an M node with an I node; and a third memory transistor configured to electrically connect the output control circuit with the I node.

20 Claims, 21 Drawing Sheets

ST : ST1, ST2, ST3, ..., STk
CKs : CK1, CK2, CK3, CK4
CKLs : CKL1, CKL2, CKL3, CKL4

SCAN SIGNAL DRIVER AND DISPLAY DEVICE INCLUDING THE SAME

CROSS-REFERENCE TO RELATED APPLICATION

The present application claims priority to and the benefit of Korean Patent Application No. 10-2022-0190908 filed on Dec. 30, 2022, in the Korean Intellectual Property Office, the entire content of which is incorporated herein by reference.

BACKGROUND

1. Field

Aspects of some embodiments of the present disclosure relate to a scan signal driver and a display device including the same.

2. Description of the Related Art

With the advancement of the information age, consumer demand for display devices for displaying images has increased. For example, display devices have been applied to various electronic devices such as smart phones, digital cameras, laptop computers, navigators, and smart televisions, among other consumer electronic devices.

Display devices may include flat panel display devices such as liquid crystal display devices, quantum dot display devices, and organic light emitting display devices.

Display device generally includes a display panel including data lines, scan signal lines, data lines, and a plurality of pixels connected to the data lines and the scan signal lines, a scan signal driver supplying scan signals to the scan signal lines, and a data driver supplying data voltages to the data lines. The scan signal driver may be located in a non-display area of the display panel.

An external compensation technique for increasing image display quality may be applied to the organic light emitting display device of the display devices. The external compensation technique may sense a pixel voltage or current according to driving characteristics of pixels, and compensate for a deviation in driving characteristics between the pixels by modulating image data based on the sensed result.

The above information disclosed in this Background section is only for enhancement of understanding of the background and therefore the information discussed in this Background section does not necessarily constitute prior art.

SUMMARY

Aspects of some embodiments of the present disclosure include a scan signal driver that may relatively stably maintain a gate-on voltage of scan signal output stages at a sensing period for external compensation by applying a sensing controller having a relatively simplified circuit structure.

Aspects of some embodiments of the present disclosure include a scan signal driver that may relatively stably maintain a gate-on voltage supplied to a pull-up control node of a scan signal output stage even when thin film transistors are switched to a depletion mode.

Aspects of some embodiments of the present disclosure include a scan signal driver that may allow all thin film transistors to operate within the range of a gate-on voltage and a gate-off voltage by separating a pull-up control node of scan signal output stages by using the thin film transistor.

According to some embodiments of the present disclosure, a scan signal driver may include a plurality of stages driven by dividing a first frame period into a display period and a sensing period, sequentially outputting scan signals at the display period. Each of the plurality of stages may include an output control circuit controlling a Q node and a QB node, and a memory control circuit controlling an M node, irregularly sets any one of the plurality of stages at the display period every frame, controls the specific stage to store a voltage, which is charged in the Q node, in the M node by using the memory control circuit when the specific stage outputs the scan signal, and controls the specific stage to output a sensing signal by using the voltage stored in the M node at the sensing period subsequent to the display period, and the memory control circuit included in each of the plurality of stages may include a first memory transistor supplying a high potential voltage to an I node based on a voltage level of the M node, a second memory transistor electrically connecting the M node with the I node based on a holding signal input from the outside, a third memory transistor electrically connecting the output control circuit with the I node based on a line selection signal input from the outside, and a fourth memory transistor supplying a second low potential voltage lower than a first low potential voltage to the I node based on a reset control signal input from the outside, and a memory capacitor between the M node and a supply line of the high potential voltage.

According to some embodiments, each of the plurality of stages receives the high potential voltage, the first low potential voltage lower than the high potential voltage and the second low potential voltage lower than the first low potential voltage as driving voltages, receives a scan signal output from a stage prior to the specific stage as a carry signal, and receives a pair of normal clocks of a plurality of normal clocks which are output by being phase-delayed as much as a designated period, any one of a plurality of low voltage clocks which are output by being phase-delayed as much as the designated period, the holding signal, the line selection signal and the reset control signal as control signals. The plurality of normal clocks may be signals swinging between the high potential voltage and the first low potential voltage. The plurality of low voltage clocks may be signals swinging between the high potential voltage and the second low potential voltage.

According to some embodiments, the specific stage may be an (n)th stage among the plurality of stages. The output control circuit included in the specific stage may include a first transistor supplying the carry signal to a P node based on an input of a second low voltage clock, a second transistor including a gate connected to the supply line of the high potential voltage and connecting the P node with the Q node, third and fourth transistors supplying a first normal clock to the QB node based on a voltage level of the P node, a fifth transistor supplying the high potential voltage to a node between the third transistor and the fourth transistor, which are connected in series, based on a voltage level of the QB node, a sixth transistor supplying a third normal clock, which is phase-inverted with the first normal clock, to an output node of the specific stage based on a voltage level of the Q node, a seventh transistor supplying the first low potential voltage to the output node based on the voltage level of the QB node, an eighth transistor supplying the high potential voltage to the QB node based on an input of the reset control signal, a first capacitor between the Q node and the output node, and a second capacitor between a gate of the first transistor and the P node.

According to some embodiments, the third memory transistor of the memory control circuit may electrically connect the I node with the P node based on an input of the line selection signal.

According to some embodiments, the line selection signal and the holding signal may be output at an irregular timing of the display period every frame to select the specific stage of the plurality of stages.

According to some embodiments, at the display period, the specific stage may supply a voltage, which is charged in the Q node and the P node, to the M node through the third memory transistor turned on by the line selection signal and the second memory transistor turned on by the holding signal, and maintains the voltage of the M node until the sensing period by turning off the second memory transistor and the third memory transistor after the M node is charged.

According to some embodiments, at the sensing period, the specific stage may supply the high potential voltage to the I node through the first memory transistor turned on by the voltage of the charged M node, and charges the P node and the Q node by using a high potential voltage supplied to the I node through the third memory transistor when the third memory transistor is turned on by the line selection signal.

According to some embodiments, at the sensing period, the specific stage may output the sensing signal through the output node in synchronization with a timing at which the third normal clock is shifted from the first low potential voltage to the high potential voltage after the P node and the Q node are charged.

According to some embodiments, at the sensing period, the specific stage may be initialized by receiving the line selection signal, the holding signal and the reset control signal after outputting the sensing signal through the output node.

According to some embodiments, a supply line of the line selection signal may be commonly connected to the plurality of stages. A supply line of the holding signal may be commonly connected to the plurality of stages. A supply line of the reset control signal may be commonly connected to the plurality of stages.

According to some embodiments of the present disclosure, a display device may include a display panel including a plurality of scan signal lines and a plurality of data lines, and a scan signal driver driving the plurality of scan signal lines. The scan signal driver may include a plurality of stages driven by dividing a first frame period into a display period and a sensing period, sequentially outputting scan signals at the display period, each of the plurality of stages may include an output control circuit controlling a Q node and a QB node, and a memory control circuit controlling an M node, irregularly sets any one of the plurality of stages at the display period every frame, controls the specific stage to store a voltage, which is charged in the Q node, in the M node by using the memory control circuit when the specific stage outputs the scan signal, and controls the specific stage to output a sensing signal by using the voltage stored in the M node at the sensing period subsequent to the display period, and the memory control circuit included in each of the plurality of stages may include a first memory transistor supplying a high potential voltage to an I node based on a voltage level of the M node, a second memory transistor electrically connecting the M node with the I node based on a holding signal input from the outside, a third memory transistor electrically connecting the output control circuit with the I node based on a line selection signal input from the outside, and a fourth memory transistor supplying a second low potential voltage lower than a first low potential voltage to the I node based on a reset control signal input from the outside, and a memory capacitor between the M node and a supply line of the high potential voltage.

According to some embodiments, each of the plurality of stages may receive the high potential voltage, the first low potential voltage lower than the high potential voltage and the second low potential voltage lower than the first low potential voltage as driving voltages, receives a scan signal output from a stage prior to the specific stage as a carry signal, and receives a pair of normal clocks of a plurality of normal clocks which are output by being phase-delayed as much as a designated period, any one of a plurality of low voltage clocks which are output by being phase-delayed as much as the designated period, the holding signal, the line selection signal and the reset control signal as control signals. The plurality of normal clocks may be signals swinging between the high potential voltage and the first low potential voltage. The plurality of low voltage clocks may be signals swinging between the high potential voltage and the second low potential voltage.

According to some embodiments, the specific stage may be an (n)th stage among the plurality of stages. The output control circuit included in the specific stage may include a first transistor supplying the carry signal to a P node based on an input of a second low voltage clock, a second transistor including a gate connected to the supply line of the high potential voltage and connecting the P node with the Q node, third and fourth transistors supplying a first normal clock to the QB node based on a voltage level of the P node, a fifth transistor supplying the high potential voltage to a node between the third transistor and the fourth transistor, which are connected in series, based on a voltage level of the QB node, a sixth transistor supplying a third normal clock, which is phase-inverted with the first normal clock, to an output node of the specific stage based on a voltage level of the Q node, a seventh transistor supplying the first low potential voltage to the output node based on the voltage level of the QB node, an eighth transistor supplying the high potential voltage to the QB node based on an input of the reset control signal, a first capacitor between the Q node and the output node, and a second capacitor between a gate of the first transistor and the P node.

According to some embodiments, the third memory transistor of the memory control circuit may electrically connect the I node with the P node based on an input of the line selection signal.

According to some embodiments, the line selection signal and the holding signal may be output at an irregular timing of the display period every frame to select the specific stage of the plurality of stages.

According to some embodiments, at the display period, the specific stage may supply a voltage, which is charged in the Q node and the P node, to the M node through the third memory transistor turned on by the line selection signal and the second memory transistor turned on by the holding signal, and maintains the voltage of the M node until the sensing period by turning off the second memory transistor and the third memory transistor after the M node is charged.

According to some embodiments, at the sensing period, the specific stage may supply the high potential voltage to the I node through the first memory transistor turned on by the voltage of the charged M node, and charges the P node and the Q node by using a high potential voltage supplied to the I node through the third memory transistor when the third memory transistor is turned on by the line selection signal.

According to some embodiments, at the sensing period, the specific stage may output the sensing signal through the output node in synchronization with a timing at which the third normal clock is shifted from the first low potential voltage to the high potential voltage after the P node and the Q node are charged.

According to some embodiments, at the sensing period, the specific stage may be initialized by receiving the line selection signal, the holding signal and the reset control signal after outputting the sensing signal through the output node.

According to some embodiments, a supply line of the line selection signal may be commonly connected to the plurality of stages. A supply line of the holding signal may be commonly connected to the plurality of stages. A supply line of the reset control signal may be commonly connected to the plurality of stages.

BRIEF DESCRIPTION OF THE DRAWINGS

The above and other aspects and features of embodiments according to the present disclosure will become more apparent by describing in more detail aspects of some embodiments thereof with reference to the attached drawings, in which.

DETAILED DESCRIPTION

Aspects of some embodiments of the present invention will now be described more fully hereinafter with reference to the accompanying drawings, in which aspects of some embodiments of the invention are shown. This invention may, however, be embodied in different forms and should not be construed as limited to the embodiments set forth herein. Rather, these embodiments are provided so that this disclosure will be more thorough and more complete, and will more fully convey the scope of embodiments according to the present invention to those skilled in the art.

It will also be understood that when a layer is referred to as being “on” another layer or substrate, it can be directly on the other layer or substrate, or intervening layers may also be present. The same reference numbers indicate the same components throughout the specification.

It will be understood that, although the terms “first,” “second,” etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

Hereinafter, aspects of some embodiments will be described in more detail with reference to the accompanying drawings.

Figure 1:
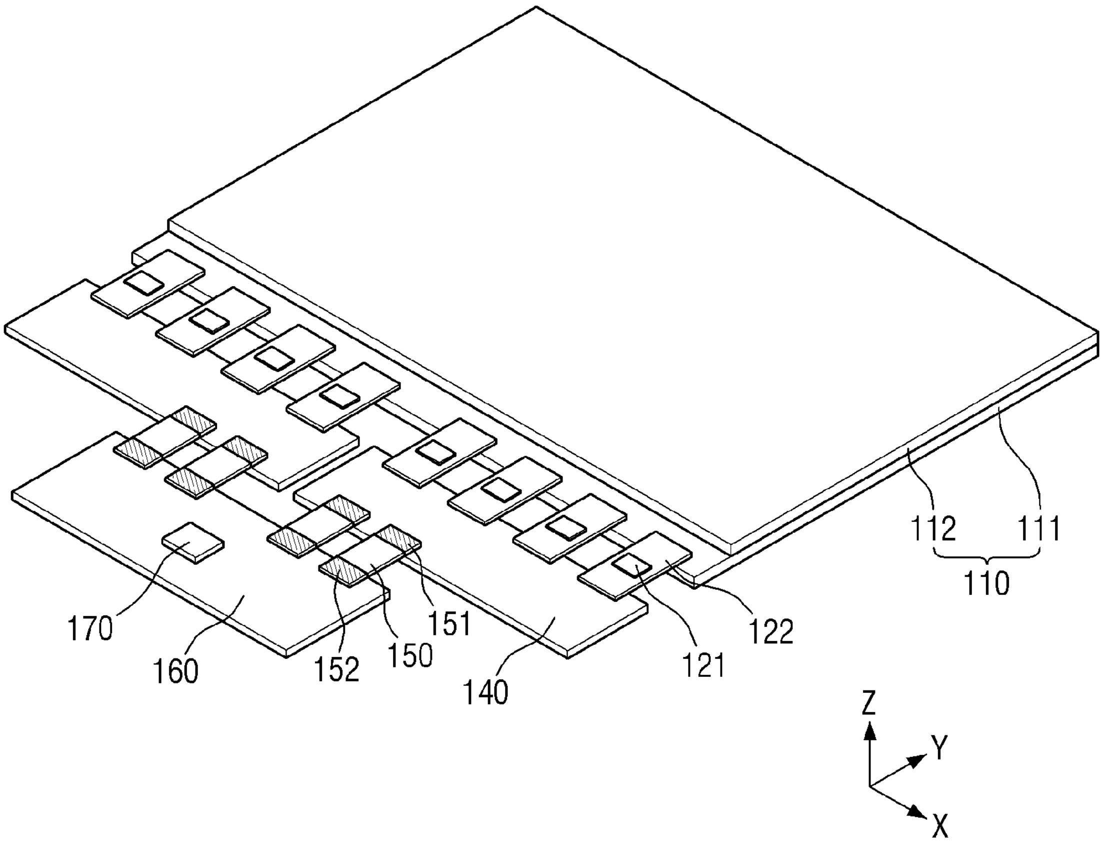
FIG. 1 is a perspective view illustrating a display device according to some embodiments.
Figure 2:
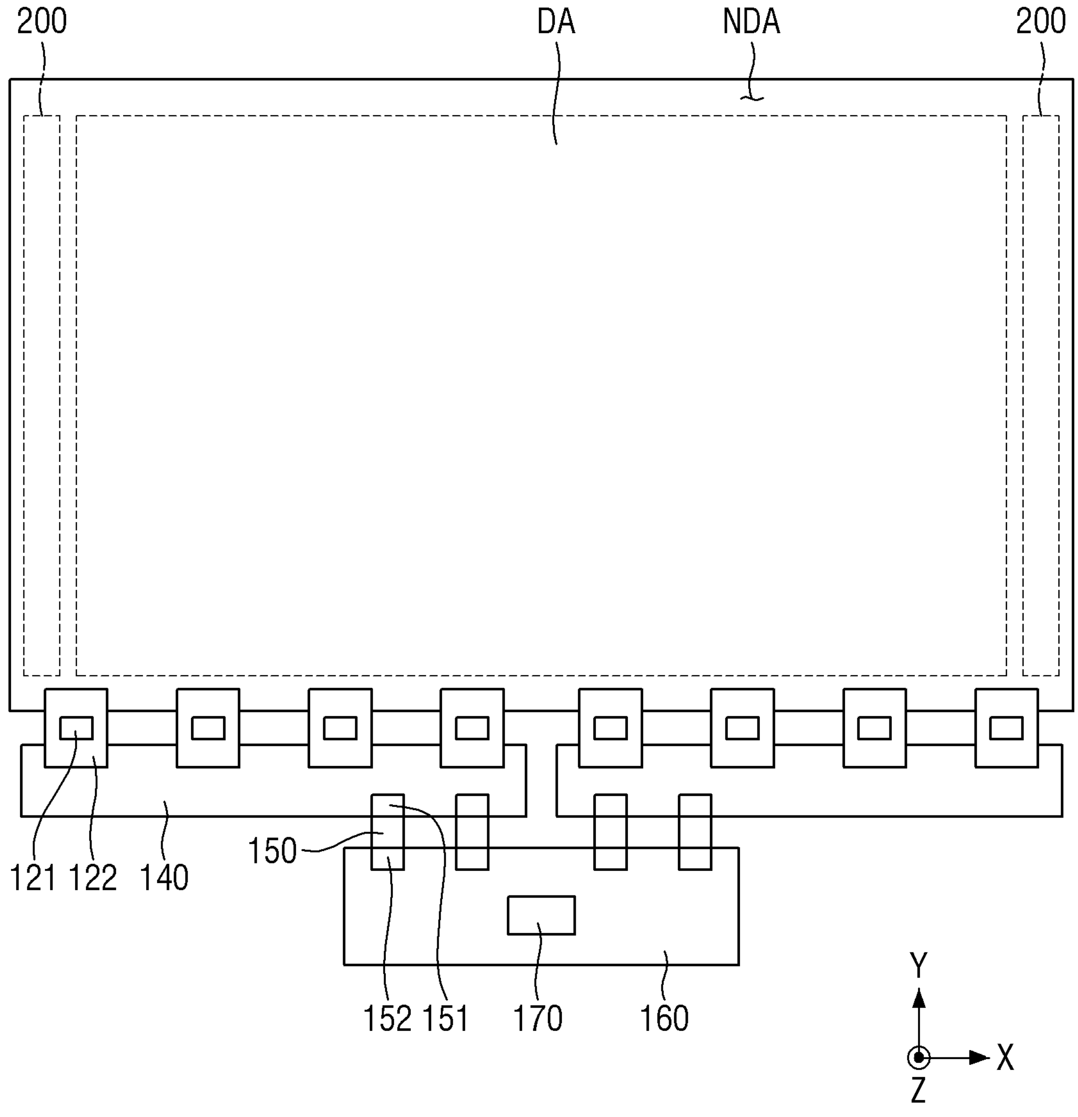
FIG. 2 is a plan view illustrating a display device according to some embodiments.
Figure 3:
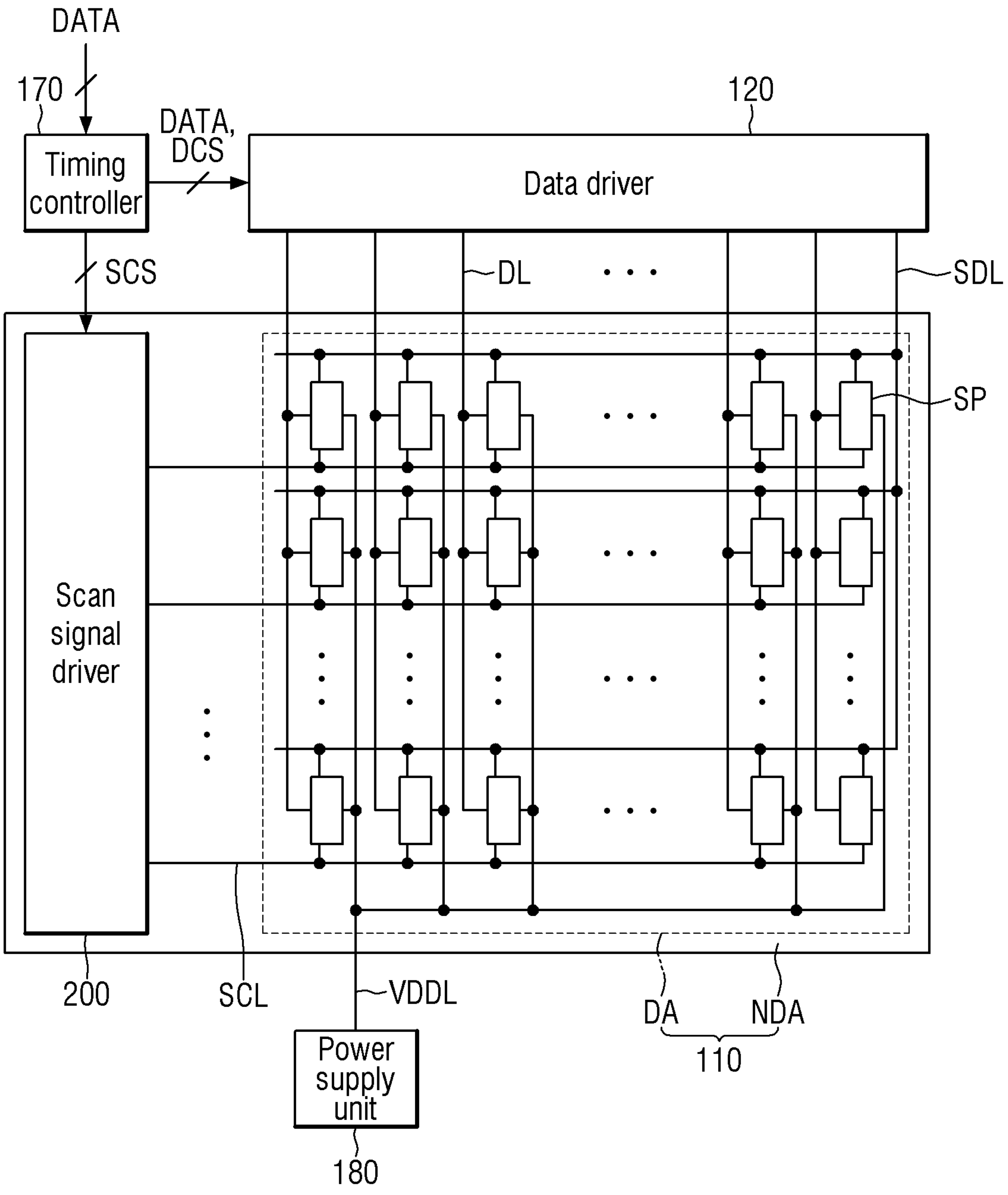
FIG. 3 is a block diagram illustrating a display device according to some embodiments.

FIG. 1 is a perspective view illustrating a display device according to some embodiments. FIG. 2 is a plan view illustrating a display device according to some embodiments. FIG. 3 is a block diagram illustrating a display device according to some embodiments.

In the present disclosure, the terms “upper”, “top” and “upper surface” refer to an upper direction based on a display panel 110, that is, Z-axis direction (e.g., a direction that is normal or perpendicular to a plane parallel to a display surface of the display device), and “lower”, “bottom” and “lower surface” refer to a lower direction based on the display panel 110, that is, an opposite direction of the Z-axis direction. Also, “left”, “right”, “upper” and “lower” refer to a direction when the display panel 110 is viewed on a plane. For example, "left" refers to an opposite direction of X-axis direction, "right" refers to the X-axis direction, "upper" refers to Y-axis direction, and "lower" refers to an opposite direction of the Y-axis direction.

In the present disclosure, a display device according to some embodiments is a device that displays moving images or still images, and may be used as a display screen of portable electronic devices such as a mobile phone, a smart phone, a tablet personal computer (PC), a smart watch, a watch phone, a mobile communication terminal, an electronic diary, an electronic book, a portable multimedia player (PMP), a navigator and an ultra mobile PC (UMPC). Also, the display device according to some embodiments may be used as a display screen of various medium and large-sized products such as a television, a laptop computer, a monitor, an advertising board and a device for Internet of things (IoT). Hereinafter, the display device according to some embodiments is illustrated as a medium and large-sized display device that includes a plurality of source drivers 121, but embodiments according to the present disclosure are not limited thereto.

The display device according to some embodiments may be a small-sized display device that includes one source driver 121, and flexible films 122, source circuit boards 140 and first cables 150 may be omitted. In addition, when the display device according to some embodiments is a small-sized display device, the source driver 121 and the timing controller 170 may be integrated into one integrated circuit, so that the source driver 121 and a timing controller 170 may be located on one control circuit board 160 or may be adhered to a first substrate 111 of the display panel 110. Examples of the medium and large-sized display device include a television and a monitor, and examples of the small-sized display device include a smart phone and a tablet PC.

Referring to FIGS. 1, 2 and 3, the display device includes a display panel 110, a data driver 120 including source drivers 121, flexible films 122, a source circuit board 140, first cables 150, a scan signal driver 200, a control circuit board 160, a timing controller 170 and a power supply unit 180.

The display panel 110 may have a rectangular shape on a plane. For example, the display panel 110 may have a rectangular planar shape having long sides in a first direction (X-axis direction) and short sides in a second direction (Y-axis direction). A corner where the long side in the first direction (X-axis direction) meets the short side in the second direction (Y-axis direction) may be formed at a right angle or rounded to have a predetermined curvature. A planar shape of the display panel 110 is not limited to a rectangular shape, and may be formed in other polygonal shape, a circular shape or an elliptical shape. In addition, although it is illustrated in FIGS. 1 and 2 that the display panel 110 is formed to be flat, embodiments according to the present disclosure are not limited thereto. The display panel 110 may include a curved portion bent with a curvature (e.g., a set or predetermined curvature).

The display panel 110 may include a first substrate 111 and a second substrate 112. The second substrate 112 may be arranged to face a first surface of the first substrate 111. The first substrate 111 and the second substrate 112 may be formed to be rigid or flexible. The first substrate 111 may be formed of glass or plastic. The second substrate 112 may be formed of glass, plastic, an encapsulation film or a barrier film. Alternatively, the second substrate 112 may be omitted.

The display panel 110 may be an organic light emitting display panel using an organic light emitting diode, a quantum dot light emitting display panel including a quantum dot light emitting layer, an inorganic light emitting display panel including an inorganic semiconductor and a micro light emitting display panel using a micro light emitting diode (LED). Hereinafter, the display panel 110 will be described as being an organic light emitting display panel, but embodiments according to the present disclosure are not limited thereto.

The display panel 110 may be divided into a display area DA in which subpixels SP are arranged to display images and a non-display area NDA which is a peripheral area of the display area DA (e.g., an area in a periphery or outside a footprint of the display area DA). The display area DA may include subpixels SP, scan signal lines SCL connected to the subpixels SP, data lines DL, sensing lines SDL and driving voltage supply lines VDDL. The scan signal lines SCL may be arranged and extended in the first direction ((X-axis direction) in the display area DA. The data lines DL may be arranged to extend in the second direction (Y-axis direction) crossing the first direction (X-axis direction) in the display area DA. The sensing line SDL may extend in the first direction (X-axis direction), and the driving voltage supply line VDDL may extend in the second direction (Y-axis direction) in the display area DA.

Each of the subpixels SP may be connected to any one of the scan signal lines SCL, one of the data lines DL, the sensing line SDL and the driving voltage supply line VDDL. Although FIG. 2 illustrates that each of the subpixels SP is connected to one scan signal line SCL and one data line DL, embodiments according to the present disclosure are not limited thereto. The subpixels SP may be commonly connected to the sensing line SDL and the driving voltage supply line VDDL.

Each of the subpixels SP may include a switching transistor, a driving transistor, a sensing transistor, a capacitor and a light emitting element. The switching transistor may be turned on based on a scan signal and a sensing signal being applied from the scan signal line SCL, and a data voltage input to the data line DL at a scan signal input period may be applied to a gate electrode of the driving transistor DT. The driving transistor DT may emit light by supplying a driving current to the light emitting element in accordance with the data voltage applied to the gate electrode.

The driving transistor, the switching transistor and the sensing transistor may be thin film transistors. The light emitting element may emit light in accordance with the driving current of the driving transistor. The light emitting element may be an organic light emitting diode that includes a first electrode, an organic light emitting layer and a second electrode. The capacitor may serve to relatively uniformly maintain the data voltage applied to the gate electrode of the driving transistor DT. A more detailed structure and operation characteristics of the subpixel SP will be described in more detail with reference to the accompanying drawings.

The non-display area NDA may be defined as an area from the outside of the display area DA to an edge of the display panel 110. The scan signal driver 200 for applying scan signals to the scan signal lines SCL may be located in the non-display area NDA.

The scan signal driver 200 outputs the scan signals to the scan signal lines SCL at an active period of each frame in accordance with the scan control signal SCS from the timing controller 170 and selectively outputs the sensing signals to the scan signal lines SCL at a vertical blank period. The scan control signal SCS may include a start signal, scan low voltage clocks, a line selection signal, a holding control signal, and a reset signal.

The scan signal driver 200 generates scan signals in accordance with the start signal and the scan low voltage clocks at an active period of each frame, and sequentially outputs the scan signals to the respective scan signal lines SCL. The scan signal driver 200 selectively generates sensing signals in accordance with the line selection signal, the holding control signal and the scan low voltage clocks, and selectively outputs the sensing signals to the scan signal lines SCL. The scan signal driver 200 is reset by a reset signal after the output of the sensing signals.

In FIG. 2, the scan signal driver 200 is formed at both sides of the display area DA, for example, in the non-display area NDA at left and right sides of the display area DA, but embodiments according to the present disclosure are not limited thereto. For example, the scan signal driver 200 may be formed at one side of the display area DA, for example, in the non-display area NDA at the left or right side of the display area DA.

One side of each of the flexible films 122 may be attached to the first surface of the first substrate 111 of the display panel 110, and the other side thereof may be attached onto one surface of the source circuit board 140. For example, because the size of the second substrate 112 is smaller than that of the first substrate 111, one side of the first substrate 111 may be exposed without being covered by the second substrate 112. The flexible films 122 may be attached to one side of the first substrate 111 exposed without being covered by the second substrate 112. Each of the flexible films 122 may be attached onto the first surface of the first substrate 111 and one surface of the source circuit board 140 by using an anisotropic conductive film.

Each of the flexible films 122 may be a flexible film such as a tape carrier package or a chip on film. The flexible films 122 may be bent toward a rear surface of the first substrate 111. In this case, the source circuit boards 140, the first cables 150 and the control circuit board 160 may be located on a rear surface of the display panel 110. Although FIGS. 1 and 2 illustrate that eight flexible films 122 are attached onto the first substrate 111 of the display panel 110, the number of flexible films 122 according to embodiments of the present disclosure is not limited thereto. For example, according to some embodiments, the display panel 110 may include additional flexible films 122 or fewer flexible films 122 without departing from the spirit and scope of embodiments according to the present disclosure.

The source drivers 121 of the data driver 120 may be located on one surface of each of the flexible films 122. The source drivers 121 may be formed of an integrated circuit (IC). The data driver 120 converts digital video data DATA into analog data voltages in accordance with a source control signal DCS of the timing controller 170 and supplies the analog data voltages to the data lines DL of the display panel 110 through the flexible film 122.

The source circuit boards 140 may be connected to the control circuit board 160 via first cables 150, respectively. Each of the source circuit boards 140 may include first connectors 151 to be connected to the first cables 150. The source circuit boards 140 may be flexible printed circuit boards or printed circuit boards. The first cables 150 may be flexible cables. The source drivers 121 may be packaged on the source circuit board 140, the control circuit board 160 or the first substrate 111 of the display panel 110 in a circuit on glass (COG) manner. Therefore, various modifications may be applied to the configuration of the source drivers 121 without limitation to FIGS. 1 and 2.

The control circuit board 160 may be coupled to the source circuit boards 140 via the first cables 150. To this end, the control circuit board 160 may include second connectors 152 to be connected to the first cables 150. The control circuit board 160 may be a flexible printed circuit board or a printed circuit board.

Although FIGS. 1 and 2 illustrate that four first cables 150 connect the source circuit boards 140 with the control circuit board 160, but the number of the first cables 150 according to embodiments of the present disclosure is not limited thereto. For example, according to some embodiments, there may be additional first cables 150 or fewer first cables 150 without departing from the spirit and scope of embodiments according to the present disclosure. In addition, although FIGS. 1 and 2 illustrate that two source circuit boards 140 are provided, the number of source circuit boards 140 is not limited thereto. For example, according to some embodiments, there may be additional circuit boards 140 or fewer circuit boards 140 without departing from the spirit and scope of embodiments according to the present disclosure.

In addition, when the number of the flexible films 122 is small, the source circuit boards 140 may be omitted. In this case, the flexible films 122 may be directly connected to the control circuit board 160.

The timing controller 170 may be located on one surface of the control circuit board 160. The timing controller 170 may be formed as an integrated circuit. The timing controller 170 receives digital video data and timing signals from a system-on-chip of a system circuit board. The timing controller 170 generates a source control signal DCS for controlling a driving timing of the source drivers 121 of the data driver 120 and a scan control signal SCS for controlling a driving timing of the scan signal driver 200 in accordance with the timing signals. The timing controller 170 outputs the scan control signals SCS to the scan signal driver 200 and outputs the digital video data DATA and the source control signal DCS to the data driver 120.

The power supply unit 180 generates a first driving voltage and supplies the first driving voltage to the driving voltage supply line VDDL. In addition, the power supply unit 180 may supply a second driving voltage to a cathode electrode of the organic light emitting diode included in each of the sub pixels SP. The first driving voltage may be a high potential voltage of a gate-on voltage magnitude for turn-on driving of an organic light emitting diode and a transistor. The second driving voltage may be a low potential voltage of a gate-off voltage magnitude for turn-off driving of an organic light emitting diode and a transistor. Therefore, the first driving voltage may have a potential higher than that of the second driving voltage.

Figure 4:
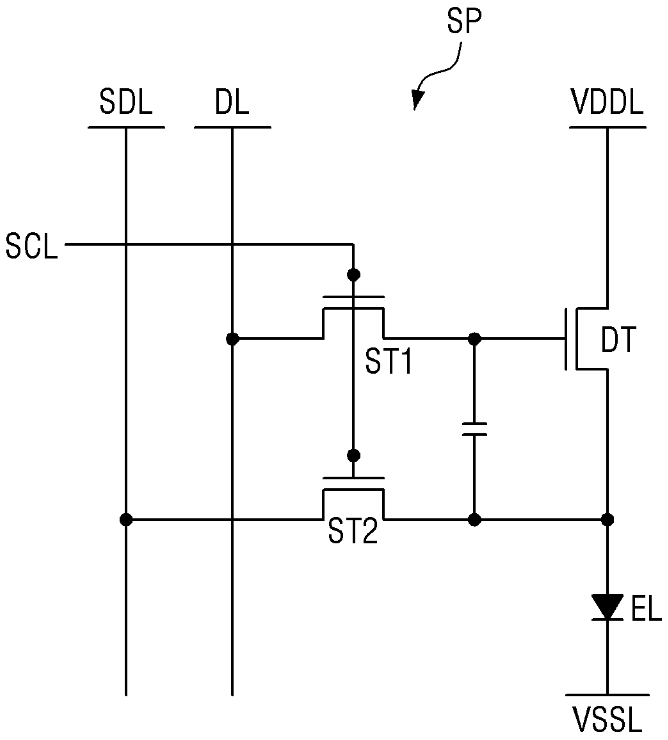
FIG. 4 is a detailed circuit diagram illustrating a subpixel according to some embodiments.

FIG. 4 is a detailed circuit diagram illustrating a subpixel according to some embodiments.

Referring to FIG. 4, the subpixel SP may include a light emitting element EL, a driving transistor DT, a switching transistor ST1, a sensing transistor ST2 and a storage capacitor Cst.

The light emitting element EL emits light in accordance with a driving current supplied through the driving transistor DT. The light emitting element EL may be an organic light emitting diode, but embodiments according to the present disclosure are not limited thereto. For example, the light emitting element EL may be a quantum dot light emitting diode, an inorganic light emitting diode or a micro light emitting diode. In this case, when the light emitting element EL is an organic light emitting diode, the light emitting element EL may include an anode electrode, a hole transporting layer, an organic light emitting layer, an electron transporting layer and a cathode electrode. When a voltage is applied to the anode electrode and the cathode electrode of the light emitting element EL, holes and electrons move to the organic light emitting layer through the hole transport layer and the electron transport layer, respectively and are combined with each other in the organic light emitting layer to emit light. The anode electrode of the light emitting element EL may be connected to a source electrode of the driving transistor DT, and the cathode electrode thereof may be connected to a second driving voltage line to which the low potential voltage lower than the high potential voltage is supplied.

The driving transistor DT adjusts a current flowing from the driving voltage supply line VDDL supplied with the high potential voltage to the light emitting element EL in accordance with a voltage difference between the gate electrode and the source electrode. The gate electrode of the driving transistor DT may be connected to a first electrode of the switching transistor ST1, the source electrode of the driving transistor DT may be connected to the anode electrode of the light emitting element EL, and a drain electrode of the driving transistor DT may be connected to the driving voltage supply line VDDL to which the high potential voltage is applied.

The switching transistor ST1 is turned on by the scan signal and the sensing signal, which are input through the scan signal line SCL, to connect the data line DL to the gate electrode of the driving transistor DT. A gate electrode of the switching transistor ST1 may be connected to the scan signal line SCL, the first electrode thereof may be connected to the gate electrode of the driving transistor DT, and a second electrode thereof may be connected to the data line DL. The switching transistor ST1 is turned on by the scan signal at an active period at which a data voltage is input to the data line DL, to supply the data voltage to the gate electrode of the driving transistor DT. On the other hand, the switching transistor ST1 is not able to apply the data voltage to the gate electrode of the driving transistor DT at a vertical blank period at which the data voltage is not applied, even though the switching transistor ST1 is turned on by the sensing signal.

In the same manner as the switching transistor ST1, the sensing transistor ST2 is turned on is turned on by the scan signal and the sensing signal, which are input through the scan signal line SCL. A gate electrode of the sensing transistor ST2 may be connected to the scan signal line SCL, a first electrode thereof may be connected to the sensing line SDL, and a second electrode thereof may be connected to the anode electrode of the light emitting element EL.

The sensing line SDL is maintained at an open state by the data driver 120 at the active period at which the data voltage is applied to the data line DL. Therefore, even though the sensing transistor ST2 is turned on by the scan signal of the active period, an output voltage or current of the driving transistor DT is not output to the sensing line SDL. On the other hand, the sensing line SDL is in a short circuit state with the data driver 120 by the data driver 120 at a vertical blank period that is an image non-display period.

Therefore, when the sensing transistor ST2 is turned on by the sensing signal at the vertical blank period, an output current of the light emitting element EL is supplied to the data driver 120 through the sensing line SDL. The data driver 120 may perform an external compensation operation at the active period by sensing an output current of the driving transistor DT, which is input through the sensing line SDL at the vertical blank period.

One of the first electrode and the second electrode of each of the switching transistor ST1 and the sensing transistor ST2 may be a source electrode, and the other one thereof may be a drain electrode.

The storage capacitor Cst is formed between the gate electrode and the source electrode of the driving transistor DT. The storage capacitor Cst stores a differential voltage between a gate voltage and a source voltage of the driving transistor DT to maintain a driving current output of the driving transistor DT during each frame period.

In FIG. 4, the driving transistor DT, the switching transistor ST1 and the sensing transistor ST2 are formed of N-type Metal Oxide Semiconductor Field Effect Transistors (MOSFET), but embodiments according to the present disclosure are not limited thereto. The driving transistor DT, the switching transistor ST1 and the sensing transistor ST2 may be formed of P-type MOSFET.

Figure 5:
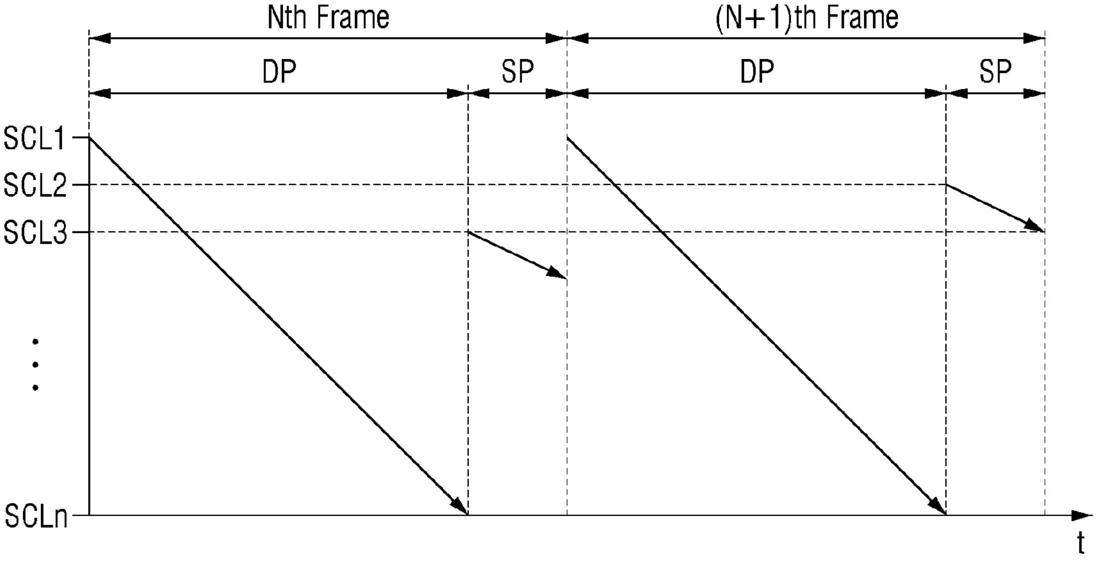
FIG. 5 is an example view illustrating a driving timing of subpixels at an (N)th frame period and an (N+1)th frame period according to some embodiments.

FIG. 5 is an example view illustrating a driving timing of subpixels at an (N)th frame period and an (N+1)th frame period.

Referring to FIG. 5, the scan signal driver 200 is driven by dividing one frame period into a display period DP and a sensing period SP. For example, each of the (N)th (N is a positive integer) frame period and the (N+1)th frame period includes a display period DP and a sensing period SP subsequent to the display period DP. In this case, the sensing period SP may be a “vertical blank period”.

The scan signal driver 200 may sequentially output a scan signal Out[n] to a plurality of scan signal lines SCL at the display period DP during one frame period. Therefore, at the display period DP, the subpixels SP may receive the data voltage based on the scan signal Out[n] and display an image based on the received data voltage. The scan signal driver 200 may previously set any one specific stage of a plurality of stages (ST of FIG. 6) at the display period DP every frame.

The previously set specific stage is set to output the sensing signal at the sensing period SP subsequent to the display period DP. The scan signal driver 200 may set any one of the plurality of stages ST as the specific stage by receiving a line selection signal (LSP in FIG. 8) and a holding signal (HP in FIG. 8) at the display period DP every frame. Therefore, the specific stage for outputting the sensing signal at the sensing period SP every frame may be irregularly changed.

At the sensing period SP during one frame period, the scan signal driver 200 may output the sensing signal by the specific stage, which is previously set at the display period DP, among the plurality of stages (ST in FIG. 6) through the scan signal line SCL. In FIG. 5, although the sensing signal is output through a third scan signal line SCL at the (N)th frame period and the sensing signal is output through a second scan signal line SCL at the (N+1)th frame period, this only illustrative, and embodiments according to the present disclosure are not limited thereto.

Within one frame period, the display period DP may be set to be longer than the sensing period SP. The data driver 120 may supply compensation data voltages obtained by compensating for electron mobility of the driving transistor DT of each of the subpixels SP to the data lines DL during the display period DP. In addition, the data driver 120 may apply sensing data voltages for compensating for electron mobility of the driving transistor DT of each of the subpixels SP to the data lines DL during the sensing period SP.

In the following description, the term “front stages” refers to stages which are positioned on an upper portion of a specific stage serving as a reference and generate scan signals Out[n] having a phase prior to that of the scan signal Out[n] output from the specific stage.

In the following description, the term "rear stages" refers to stages which are positioned on a lower portion of a specific stage serving as a reference and generate scan signals Out[n] having a phase subsequent to that of the scan signal Out[n] output from the specific stage.

In the following description, TFTs constituting the respective stages ST of the present disclosure may be implemented as at least one of oxide TFTs, a-Si:H TFTs or poly-TFTs of an LTPS process.

In the following description, the transistors (i.e., TFTs) constituting the respective stages ST of the present disclosure are formed of N type MOSFETs, but embodiments according to the present disclosure are not limited thereto. That is, the TFTs constituting the respective stages ST of embodiments according to the present disclosure may be formed of P-type MOSFETs.

In the following description, charging, activation or high state of a specific node means that a high potential voltage VGH or a voltage corresponding thereto is charged (that is, pulled up) in the node, and deactivation or low state of the specific node means that a first low potential voltage VGL, a second low potential voltage VGLL or a voltage corresponding thereto is charged in the node.

Figure 6:
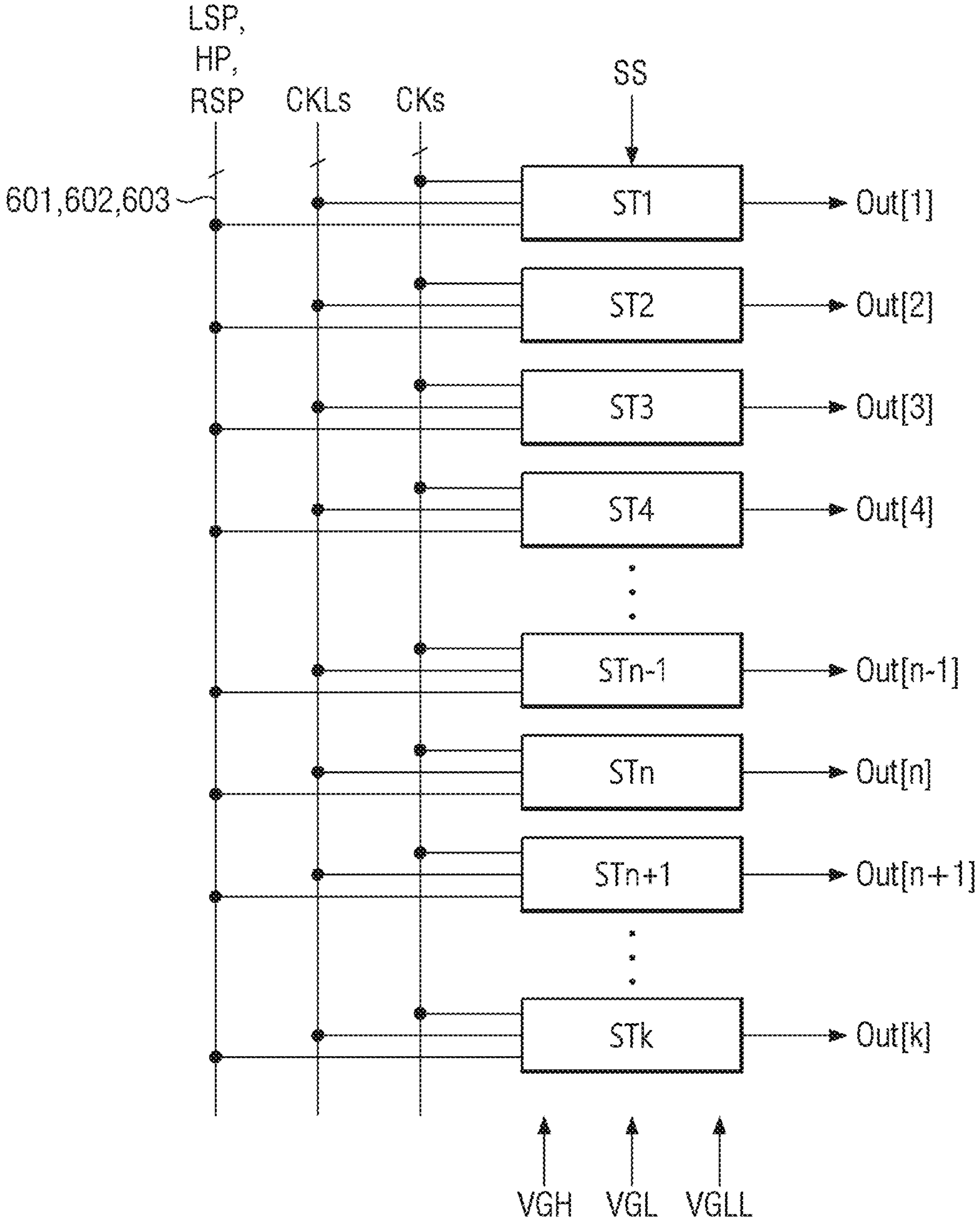
FIG. 6 is an example view illustrating a scan signal driver according to some embodiments.

FIG. 6 is an example view illustrating a scan signal driver 200 according to some embodiments.

Referring to FIG. 6, the scan signal driver 200 according to some embodiments may include a plurality of stages ST that are dependently connected. The plurality of stages ST may include, for example, k number of stages from a first stage ST1 to a (k)th stage STk. According to some embodiments, the scan signal driver 200 may further include at least one dummy stage as a front stage of the first stage ST1. According to some embodiments, the scan signal driver 200 may further include at least one dummy stage as a rear stage of the (k)th stage STk.

Each of the plurality of stages ST may receive the high potential voltage VGH, the first low potential voltage VGL and the second low potential voltage VGLL. The high potential voltage VGH may be a gate-on voltage for turning a TFT, or a gate high voltage. The first low potential voltage VGL may be a gate-off voltage for turning off the TFT, or a gate low voltage. The second low potential voltage VGLL may be a voltage having a potential lower than that of the first low potential voltage VGL.

Each of the plurality of stages ST may be commonly connected to a line selection signal supply line 601 to which the line selection signal LSP is applied, a holding signal supply line 602 to which the holding signal HP is applied, and a reset control signal supply line 603 to which the reset control signal RSP is applied. Therefore, when the line selection signal LSP and/or the holding signal HP is output at a specific timing during the display period DP, the plurality of stages ST may commonly (i.e., globally) receive the line selection signal LSP and/or the holding signal HP. In addition, when at least one of the line selection signal LSP, the holding signal HP, or the reset control signal RSP is output at a specific timing during the sensing period SP, the plurality of stages ST may commonly (i.e., globally) receive the at least one of the line selection signal LSP, the holding signal HP, or the reset control signal RSP. According to some embodiments, the line selection signal LSP, the holding signal HP and the reset control signal RSP may be generated by the timing controller 170, but embodiments according to the present disclosure are not limited thereto.

Each of the plurality of stages ST may receive a pair of normal clocks (e.g., CK1 and CK3) among a plurality of normal clocks CK. The plurality of normal clocks are signals swinging between the high potential voltage VGH and the first low potential voltage VGL, and may be signals output by being phase-delayed as much as a designated period (e.g., one horizontal period 1H). The pair of normal clocks (e.g., CK1 and CK3) input to each stage ST may be normal clocks of which phases are inverted with each other. For example, as will be described below with reference to FIG. 7, an arbitrary (n)th stage STn may receive a first normal clock CK1 and a third normal clock CK3 that is phase-inverted with the first normal clock CK1.

Each of the plurality of stages ST may receive any one of a plurality of low voltage clocks CKL. For example, as will be described below with reference to FIG. 7, the arbitrary (n)th stage STn may receive a second low voltage clock CKL2 from the plurality of low voltage clocks CKL. A phase of the plurality of low voltage clocks CLK may be substantially the same as that of the plurality of normal clocks CK. For example, the plurality of low voltage clocks CKL may include first to fourth low voltage clocks CKL1 to CKL4 output by being phase-delayed as much as a designated period (e.g., one horizontal period 1H), and the plurality of normal clocks CK may include first to fourth normal clocks CK1 to CK4 having the same phase. The plurality of flow voltage clocks CKL may be signals swinging between the high potential voltage VGH and the second low potential voltage VGLL unlike the plurality of normal clocks CK. For example, as will be described in more detail below with reference to FIG. 7, the arbitrary (n)th stage STn may receive the first normal clock CK1 and the third normal clock CK3 that is phase-inverted with the first normal clock CK1.

At the display period DP during one frame period, the plurality of stages ST may sequentially output the scan signals (e.g., Out[n]) based on voltages (e.g., predetermined voltages) and signals (e.g., predetermined signals) as described above. An output node (e.g., O[n] in FIG. 7) of each of the plurality of stages ST is connected to the scan signal line SCL. Therefore, at the display period DP during one frame period, the plurality of stages ST may sequentially output the scan signals Out[n] to the scan signal lines SCL.

The scan signal Out[n] output from each of the plurality of stages ST may be supplied to the rear stage as a carry signal. Each of the stages may output the scan signal Out[n] in response to the carry signal input from the front stage. The first stage ST1 of the plurality of stages ST may receive a start signal SS from the outside as the carry signal. The scan signal Out[n] output from each of the plurality of stages ST may be supplied to the front stage as a reset signal. Each of the stages may shift a potential of the output node O[n] from the high potential voltage VGH to the first low potential voltage VGL in response to the reset signal input from the rear stage. The (k)th stage STk, which is the last stage, among the plurality of stages ST may receive the reset signal from a dummy stage.

At the display period DP during one frame period, the line selection signal LSP and the holding signal HP may be output at a random timing at which any one specific stage of the plurality of stages ST outputs the scan signal Out[n]. Therefore, the specific stage may output the scan signal Out[n] and charge (that is, pull up) an M node (e.g., M[n] in FIG. 7) of a memory control circuit 702. The specific stage may maintain a potential of the charged M node M[n] for the display period DP and then output the sensing signal by charging a Q node (Q[n] in FIG. 7) by using a voltage of the M node M[n] at the sensing period SP. In this case, the sensing signal may be a scan control signal for selecting a pixel line to supply sensing data voltages generated for external compensation during the sensing period SP. Therefore, the sensing signal output from the specific stage at the sensing period SP may be a signal that is not related with a display of an image.

Figure 7:
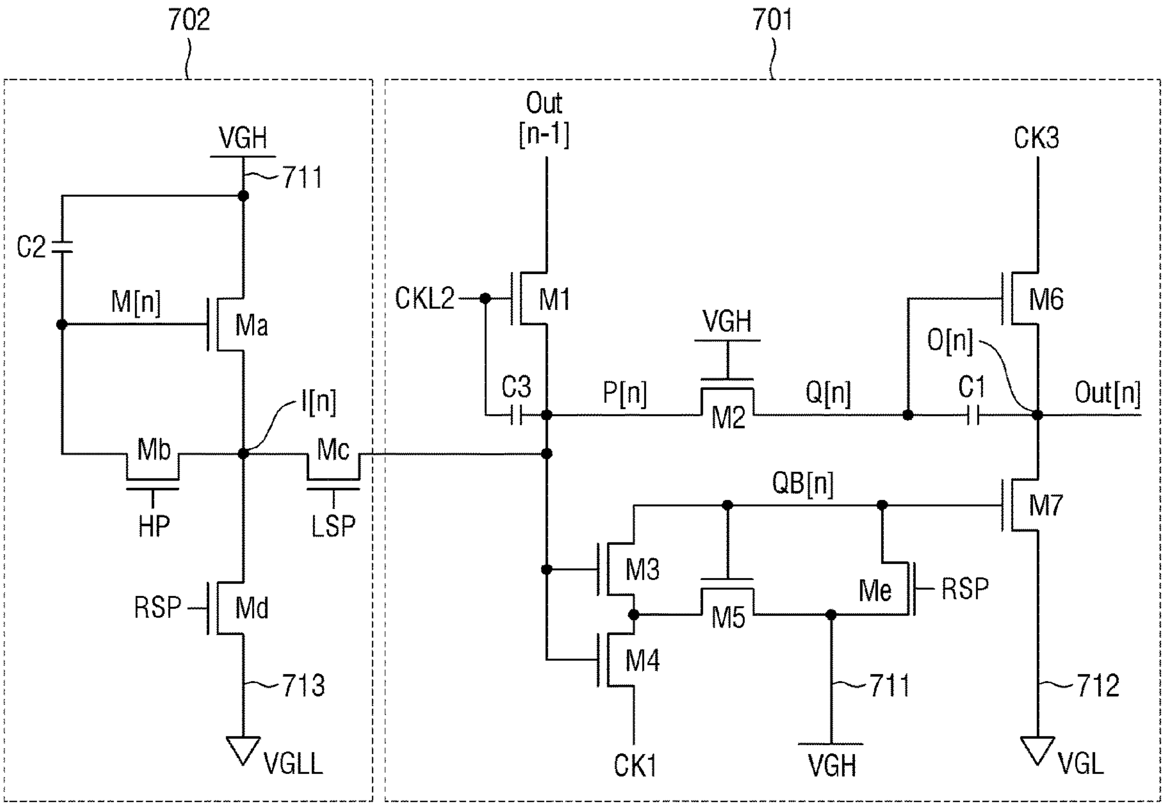
FIG. 7 is a circuit diagram illustrating an arbitrary (n)th stage shown in FIG. 6 according to some embodiments.

FIG. 7 is a circuit diagram illustrating the arbitrary (n)th stage shown in FIG. 6.

Referring to FIG. 7, the scan signal driver 200 includes a plurality of stages ST, and circuits constituting the respective stages ST may be the same (or substantially the same) as each other. For example, FIG. 7 illustrates a circuit that constitutes the arbitrary (n)th stage of the plurality of stages ST. Therefore, elements of the (n)th stage STn, which will be described below, are the same (or substantially the same) as those of the other stages, and a driving method of the (n)th stage STn, which will be described below, is the same (or substantially the same) as that of each of the other stages.

As shown, each stage (i.e., the arbitrary (n)th stage STn) of the scan signal driver 200 according to some embodiments may include an output control circuit 701 for controlling the Q node Q[n] and a QB node QB[n], and a memory control circuit 702 controlling the (M) node M[n].

The memory control circuit 702 may include a structure of 4T1C. For example, the memory control circuit 702 may include a first memory transistor Ma for supplying the high potential voltage VGH to an I node I[n] based on a voltage level of the M node M[n], a second memory transistor Mb for electrically connecting the M node M[n] with the I node I[n] based on the holding signal HP input from the outside, a third memory transistor Mc for electrically connecting the output control circuit 701 with the I node I[n] based on the line selection signal LSP input from the outside, a fourth memory transistor Md for supplying the second low potential voltage VGLL lower than the first low potential voltage VGL to the I node I[n] based on the reset control signal RSP input from the outside, and a memory capacitor C2 located between the M node M[n] and a supply line 711 of the high potential voltage VGH.

A first electrode (e.g., drain electrode) of the first memory transistor Ma may be connected with the supply line 711 of the high potential voltage VGH in order to supply the high potential voltage VGH to the I node I[n] when the first memory transistor Ma is turned on.

A second electrode (e.g., source electrode) of the fourth memory transistor Md may be connected with the supply line 713 of the second low potential voltage VGLL in order to supply the second low potential voltage VGLL to the I node I[n] when the fourth memory transistor Md is turned on.

When a line selection signal LSP and a holding signal HP, which are set to be randomly output in synchronization with a timing at which the (n)th stage STn outputs the scan signal Out[n] during the display period DP of a specific frame, the second memory transistor Mb and the third memory transistor Mc of the (n)th stage STn may be turned on to electrically connect the Q node Q[n] with the M node M[n]. Therefore, the M node M[n] may be charged, and the potential of the charged M node M[n] may be maintained for the display period DP. Afterwards, when the line selection signal LSP is output at the sensing period SP, the third memory transistor Mc of the (n)th stage STn may be turned on. Therefore, the (n)th stage M[n] may output the sensing signal by charging the Q node (Q[n] in FIG. 7) by using the voltage of the M node M[n] at the sensing period SP.

The output control circuit 701 may include a structure of 8T2C. For example, the output control circuit 701 may include a first transistor M1 for supplying a carry signal to a P node P[n] based on an input of the second low voltage clock CKL2, a second transistor M2 including a gate connected to the supply line 711 of the high potential voltage VGH and connecting the P node P[n] with the Q node Q[n], third and fourth transistors M3 and M4 for supplying the first normal clock CK1 to the QB node QB[n] based on a voltage level of the P node P[n], a fifth transistor M5 for supplying the high potential voltage VGH to a node between the third transistor M3 and the fourth transistor M4, which are connected in series, based on a voltage level of the QB node QB[n], a sixth transistor M6 for supplying the third normal clock CK3 phase-inverted with the first normal clock CK1 to the output node O[n] of the specific stage based on a voltage level of the Q node Q[n], a seventh transistor M7 for supplying the first low potential voltage VGL to the output node O[n] based on a voltage level of the QB node QB[n], an eighth transistor Me for supplying the high potential voltage VGH to the QB node QB[n] based on the input of the reset control signal RSP, a first capacitor C1 located between the Q node Q[n] and the output node O[n], and a second capacitor C3 located between a gate of the first transistor M1 and the P node P[n].

A gate (e.g., gate electrode) of the second transistor M2 may be connected with the supply line 711 of the high potential voltage VGH in order to connect the P node P[n] with the Q node Q[n] when the second transistor M2 is turned on.

A second electrode (e.g., source electrode) of the seventh transistor M7 may be connected to a supply line 712 of the first low potential voltage VGL in order to supply the first low potential voltage VGL to the output node O[n] when the seventh transistor M7 is turned on.

A first electrode (e.g., drain electrode) of the eighth transistor Me may be connected to the supply line 711 of the high potential voltage VGH in order to supply the high potential voltage VGH to the QB node QB[n] when the eighth transistor Me is turned on.

Figure 8:
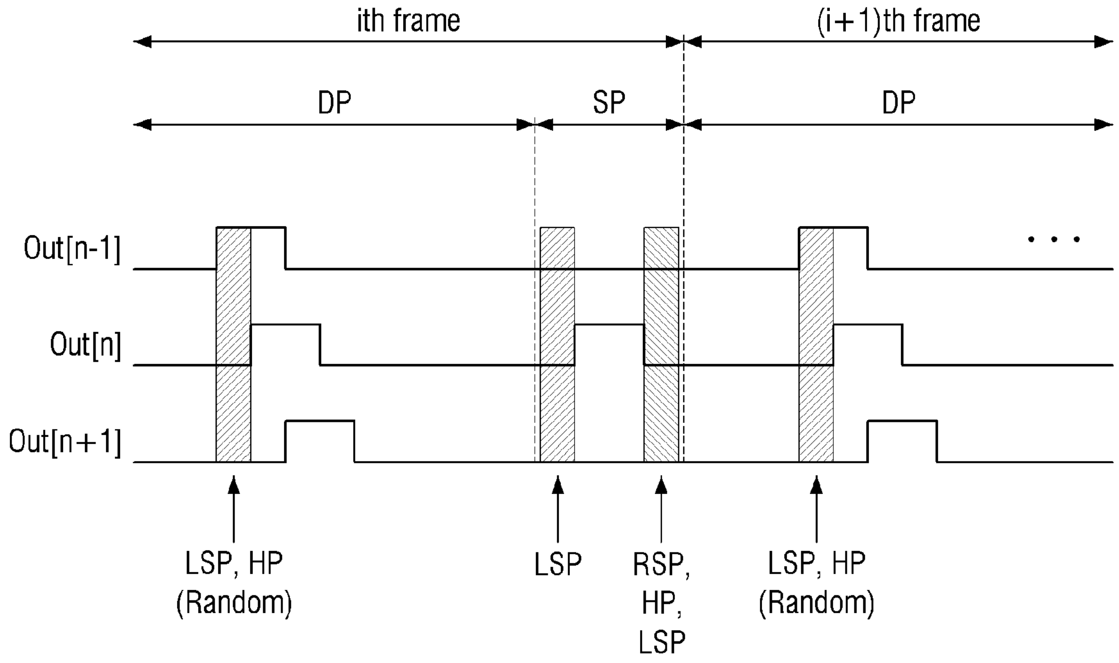
FIG. 8 is an example view illustrating a driving timing of subpixels at an (i)th frame period and an (i+1)th frame period according to some embodiments.

FIG. 8 is an example view illustrating a driving timing of scan circuit stages continuous at an (i)th frame period and an (i+1)th frame period.

Referring to FIG. 8, the scan signal driver 200 is driven by dividing one frame period into a display period DP and a sensing period SP. For example, each of an (i)th (i is a positive integer) frame period and an (i+1)th frame period includes a display period DP and a sensing period SP subsequent to the display period DP. In this case, the sensing period SP may be a "vertical blank period".

The scan signal driver 200 may receive the line selection signal LSP and the holding signal HP at a random timing at the display period DP every frame. For example, the scan signal driver 200 may receive the line selection signal LSP and the holding signal HP at a specific timing during the display period DP of a specific frame, which may be a timing at which the Q node Q[n] of the (n)th stage STn is charged (pulled up) so that the (n)th stage STn outputs the scan signal Out[n]. Therefore, at the display period DP of the specific frame, the (n)th stage STn of the plurality of stages ST may be selected.

The scan signal driver 200 receives the line selection signal LSP at the sensing period SP every frame, and thus only the specific stage selected at the display period DP of the plurality of stages ST may output the sensing signal. For example, when the (n)th stage STn is selected at the display period DP of the specific frame, the (n)th stage STn may output the sensing signal in response to the line selection signal LSP at the sensing period SP. After the selected specific stage outputs the sensing signal, the scan signal driver 200 may perform initialization by receiving the line selection signal LSP, the holding signal HP and the reset control signal RSP.

Figure 9:
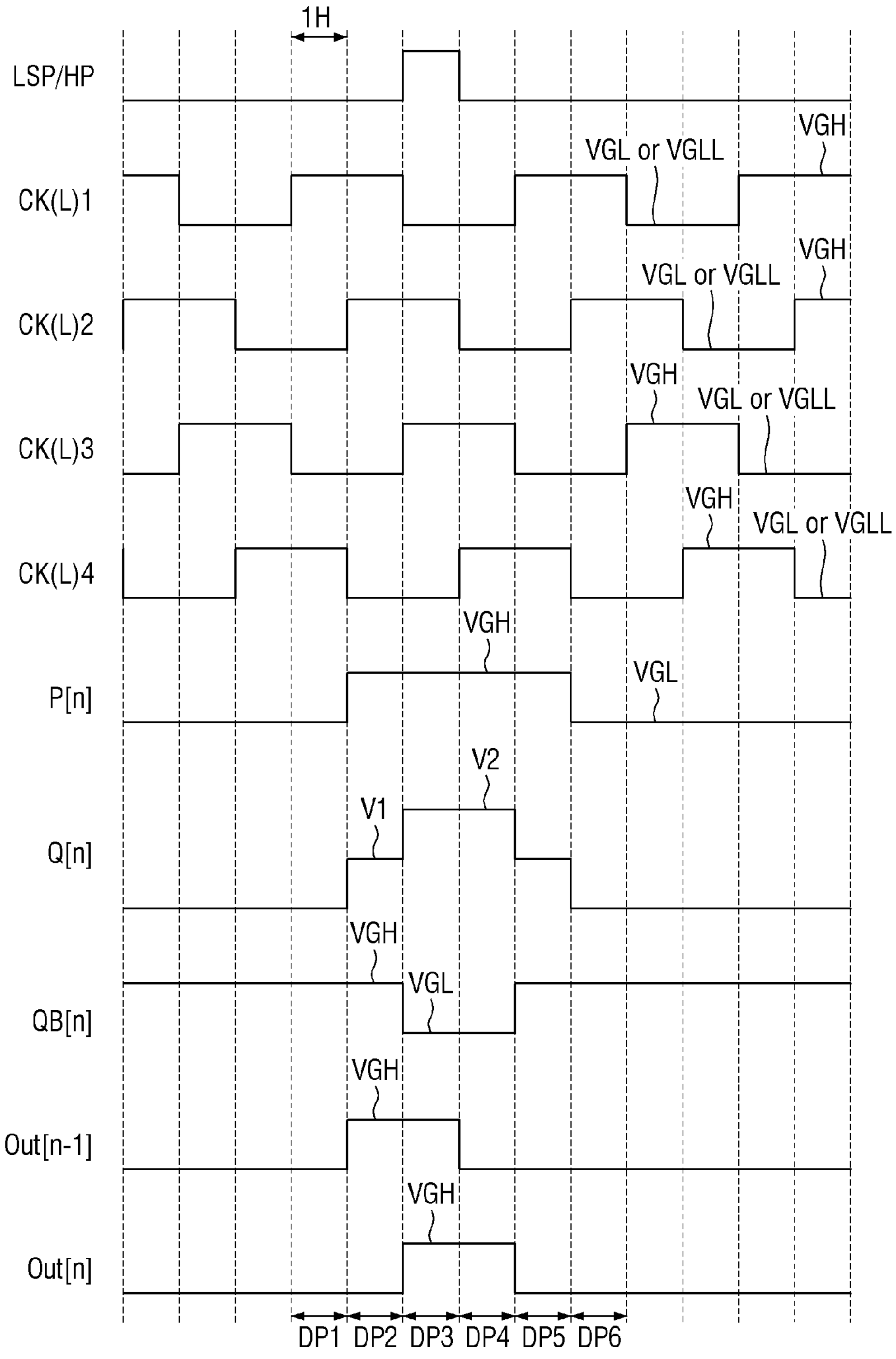
FIG. 9 is a signal waveform diagram illustrating a display period of a scan signal driver based on an arbitrary (n)th stage according to some embodiments.

FIG. 9 is a signal waveform diagram illustrating a display period DP of a scan signal driver 200 based on an arbitrary (n)th stage according to some embodiments.

In FIG. 9, a period DP1 represents a first sub-period DP1 of the display period DP based on the (n)th stage STn. This period will be described in more detail later with reference to FIG. 10A.

In FIG. 9, a period DP2 represents a second sub-period DP2 of the display period DP based on the (n)th stage STn. This period will be described in more detail later with reference to FIG. 10B.

In FIG. 9, a period DP3 represents a third sub-period DP3 of the display period DP based on the (n)th stage STn. This period will be described in more detail later with reference to FIG. 10C.

In FIG. 9, a period DP4 represents a fourth sub-period DP4 of the display period DP based on the (n)th stage STn. This period will be described in more detail later with reference to FIG. 10D.

In FIG. 9, a period DP5 represents a fifth sub-period DP5 of the display period DP based on the (n)th stage STn. This period will be described in more detail later with reference to FIG. 10E.

In FIG. 9, a period DP6 represents a sixth sub-period DP6 of the display period DP based on the (n)th stage STn. This period will be described in more detail later with reference to FIG. 10F.

At the display period DP, each of the plurality of stages ST may receive a pair of normal clocks (e.g., CK1 and CK3) of a plurality of normal clocks CK. The plurality of normal clocks CK are signals swinging between the high potential voltage VGH and the first low potential voltage VGLL, and may be signals output by being phase-delayed as much as a designated period (e.g., one horizontal period 1H).

The pair of normal clocks CK1 and CK3 input to each stage may be clocks of which phases are inverted with each other. For example, an arbitrary (n)th stage STn may receive a first normal clock CK1 and a third normal clock CK3 that is phase-inverted with the first normal clock CK1.

At the display period DP, each of the plurality of stages ST may receive any one of a plurality of low voltage clocks CKL. For example, the arbitrary (n)th stage STn may receive a second low voltage clock CKL2 from the plurality of low voltage clocks CKL.

A phase of the plurality of low voltage clocks CKL may be substantially the same as that of the plurality of normal clocks CK. For example, the plurality of low voltage clocks CKL may include first to fourth low voltage clocks CKL1 to CKL4 output by being phase-delayed as much as a designated period (e.g., one horizontal period 1H), and the plurality of normal clocks CK may include first to fourth normal clocks CK1 to CK4 having the same phase.

The plurality of low voltage clocks CKL may be signals swinging between the high potential voltage VGH and the second low potential voltage VGLL unlike the plurality of normal clocks CK.

Figure 10A:
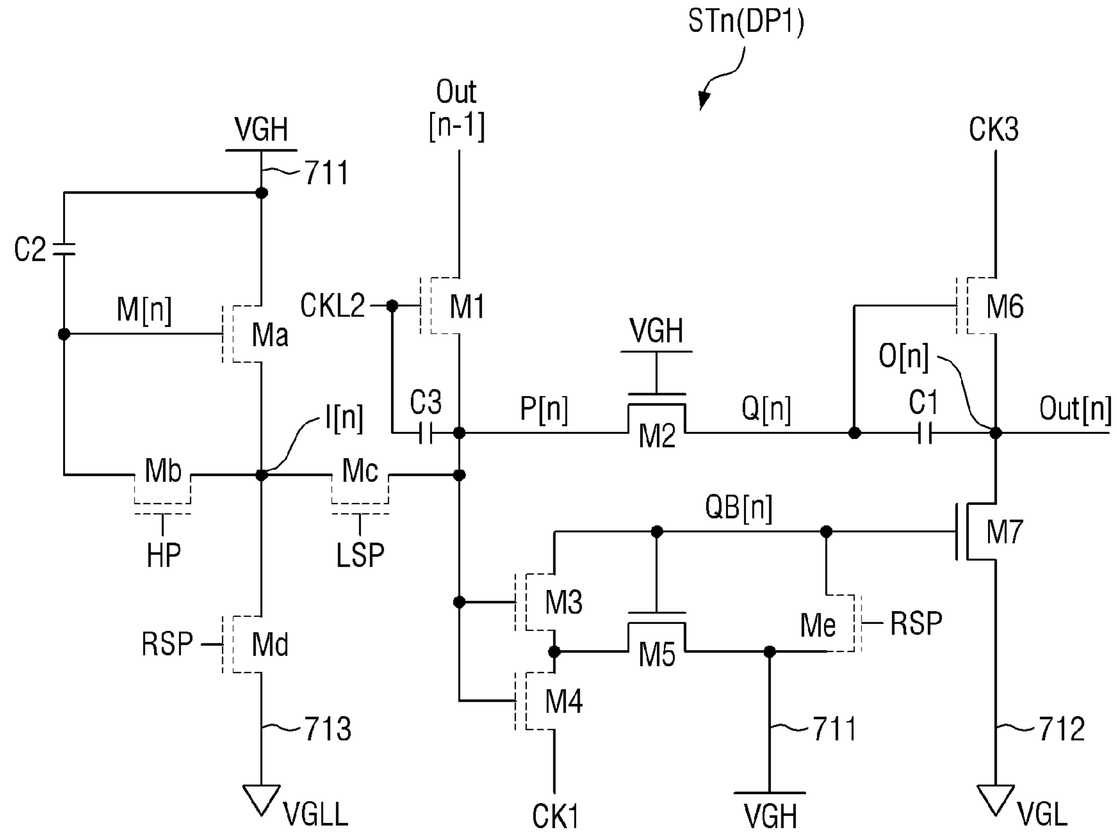
FIG. 10A is a circuit diagram illustrating an operation of an (n)th stage for a first sub-period of a display period according to some embodiments.

FIG. 10A is a circuit diagram illustrating an operation of an (n)th stage for a first sub-period DP1 of a display period DP. According to some embodiments, at the first sub-period DP1 of the display period DP, each state of transistors included in the (n)th stage STn may be listed as illustrated in Table 1.

TABLE 1

| First sub-period DP1 of display period DP | |
|---|---|
| Transistor | State |
| First memory transistor Ma | Off |
| Second memory transistor Mb | Off |
| Third memory transistor Mc | Off |
| Fourth memory transistor Md | Off |
| First transistor M1 | Off |
| Second transistor M2 | On |
| Third transistor M3 | Off |
| Fourth transistor M4 | Off |
| Fifth transistor M5 | On |
| Sixth transistor M6 | Off |
| Seventh transistor M7 | On |
| Eighth transistor Me | Off |

1 Referring to FIGS. 9 and 10*a* and Table 1, at the first sub-period DP1 of the display period DP, the QB node QB[n] may be in a high state. Therefore, the seventh transistor M7 is turned on, and the turned-on seventh transistor M7 applies the low potential voltage to the output node O[n] of the (n)th stage STn. Therefore, the output node O[n] of the (n)th stage STn may be in a low state. In addition, at the first sub-period DP1 of the display period DP, while the QB node QB[n] is being in a high state, each of the M node M[n], the P node P[n] and the Q node Q[n] may be in a low state.

Figure 10B:
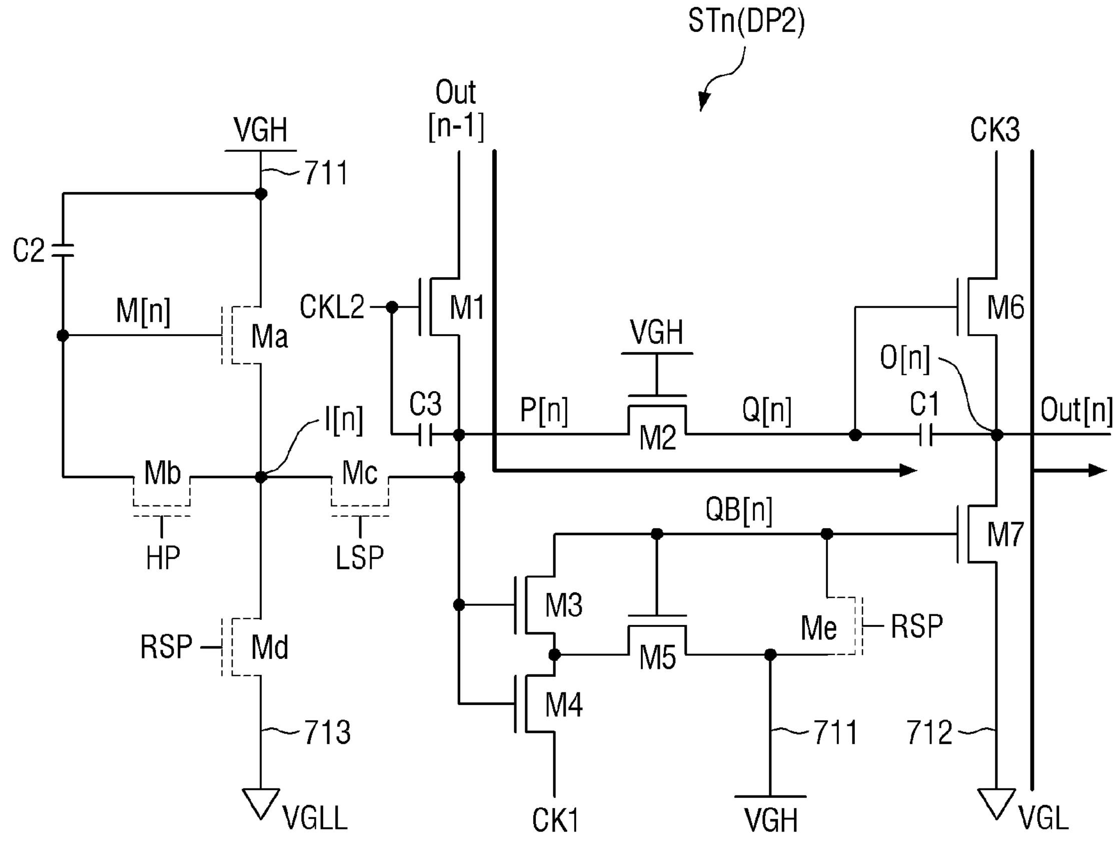
FIG. 10B is a circuit diagram illustrating an operation of an (n)th stage for a second sub-period of a display period according to some embodiments.

FIG. 10B is a circuit diagram illustrating an operation of an (n)th stage STn for a second sub-period DP2 of a display period DP. According to some embodiments, at the second sub-period DP2 of the display period DP, each state of transistors included in the (n)th stage STn may be listed as illustrated in Table 2.

TABLE 2

| Second sub-period DP2 of display period DP | |
|---|---|
| Transistor | State |
| First memory transistor Ma | Off |
| Second memory transistor Mb | Off |
| Third memory transistor Mc | Off |
| Fourth memory transistor Md | Off |
| First transistor M1 | On |
| Second transistor M2 | On |
| Third transistor M3 | On |
| Fourth transistor M4 | On |
| Fifth transistor M5 | On |
| Sixth transistor M6 | On |
| Seventh transistor M7 | On |
| Eighth transistor Me | Off |

Referring to FIGS. 9 and 10*b* and Table 2, at the second sub-period DP2 of the display period DP, an (n−1)th stage STn−1, which is a front stage of the (n)th stage, may output the scan signal Out[n]. Therefore, the (n)th stage STn may receive the scan signal Out[n] of the (n−1)th stage STn−1 as a carry signal. In addition, at the second sub-period DP2 of the display period DP, the second low voltage clock CKL2 may be shifted from a low state to a high state and accordingly, the first transistor M1 is turned on. Therefore, the first transistor M1 may supply the carry signal input from the (n−1)th stage STn−1 to the P node P[n], and the P node P[n] and the Q node Q[n] may be charged at a high state. For example, at the second sub-period DP2, the Q node Q[n] may be charged at a first voltage level V1 corresponding to the high state.

Also, at the second sub-period DP2 of the display period DP, the sixth transistor M6 is turned on as the Q node Q[n] is charged at the high state, but because the third normal clock CK3 has a voltage level of the first low potential voltage VGL, the output node O[n] of the (n)th stage STn may maintain the low state.

Figure 10C:
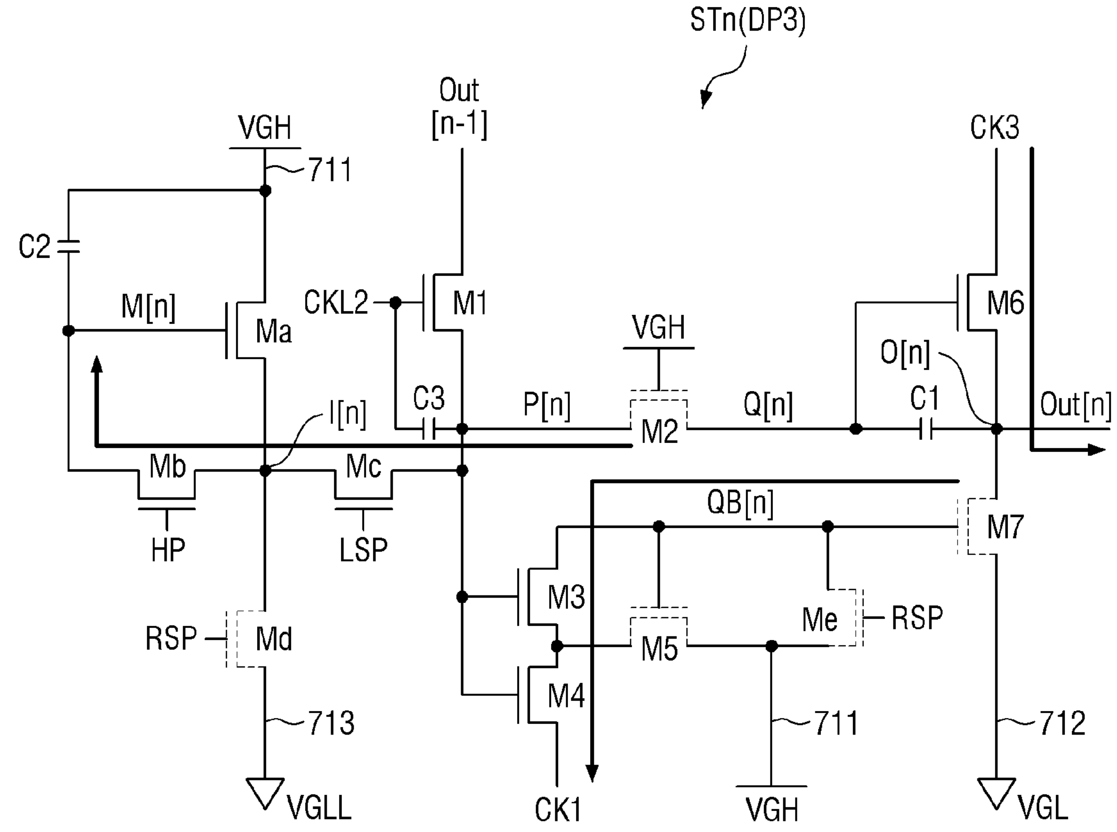
FIG. 10C is a circuit diagram illustrating an operation of an (n)th stage for a third sub-period of a display period according to some embodiments.

FIG. 10C is a circuit diagram illustrating an operation of the (n)th stage STn for a third sub-period DP3 of the display period DP. According to some embodiments, at the third sub-period DP3 of the display period DP, each state of transistors included in the (n)th stage STn may be listed as illustrated in Table 3.

TABLE 3

| Third sub-period DP3 of display period DP | |
|---|---|
| Transistor | State |
| First memory transistor Ma | On |
| Second memory transistor Mb | On |
| Third memory transistor Mc | On |
| Fourth memory transistor Md | Off |
| First transistor M1 | On |
| Second transistor M2 | Off |
| Third transistor M3 | On |
| Fourth transistor M4 | On |
| Fifth transistor M5 | Off |
| Sixth transistor M6 | On |
| Seventh transistor M7 | Off |
| Eighth transistor Me | Off |

Referring to FIGS. 9 and 10*c* and Table 3, at the third sub-period DP3 of the display period DP, as the third normal clock CK3 is shifted from the first low potential voltage VGL to the high potential voltage VGH, the Q node Q[n] may be bootstrapped to become a second voltage level V2 higher than the first voltage level V1. Therefore, the output node O[n] of the (n)th stage STn is shifted from a low state to a high state, and the (n)th stage STn may output the scan signal Out[n]. In FIGS. 9 and 10*c* and Table 3, it is assumed that the line selection signal LSP and the holding signal HP are input at the third sub-period DP3 of the display period DP at which the (n)th stage STn outputs the scan signal Out[n]. When the line selection signal LSP and the holding signal HP are input at the third sub-period DP3 of the display period DP, the second memory transistor Mb and the third memory transistor Mc may be turned on. Therefore, the M node M[n], the P node P[n] and the Q node Q[n] of the (n)th stage STn may be electrically connected to one another, and the M node M[n] may be charged at a high state.

M nodes M[n−2], M[n−1] and M[n+1] of an (n−2)th stage STn−2, an (n−1)th stage STn−1 and an (n+1)th stage STn+1 may be charged at high states at a period at which the M node M[n] of the (n)th stage STn is charged at the high state. This is because that P nodes P[n−2], P[n−1], P[n+1] of the (n−2)th stage STn−2, the (n−1)th stage STn−1 and the (n+1)th stage STn+1 are in the high states at the third sub-period DP3 at which the line selection signal LSP and the holding signal HP are output. However, as will be described below in more detail with reference to FIG. 11, at the sensing period SP, the first normal clock CK1, the second normal clock CK2 and the fourth normal clock CK4 except for the third normal clock CK3 among the plurality of normal clocks CK are all set to the first low potential voltage VGL state, so that only the (n)th stage STn of the (n−2)th stage STn−2 to the (n+1)th stage STn+1 may output the sensing signal at the sensing period SP.

Figure 10D:
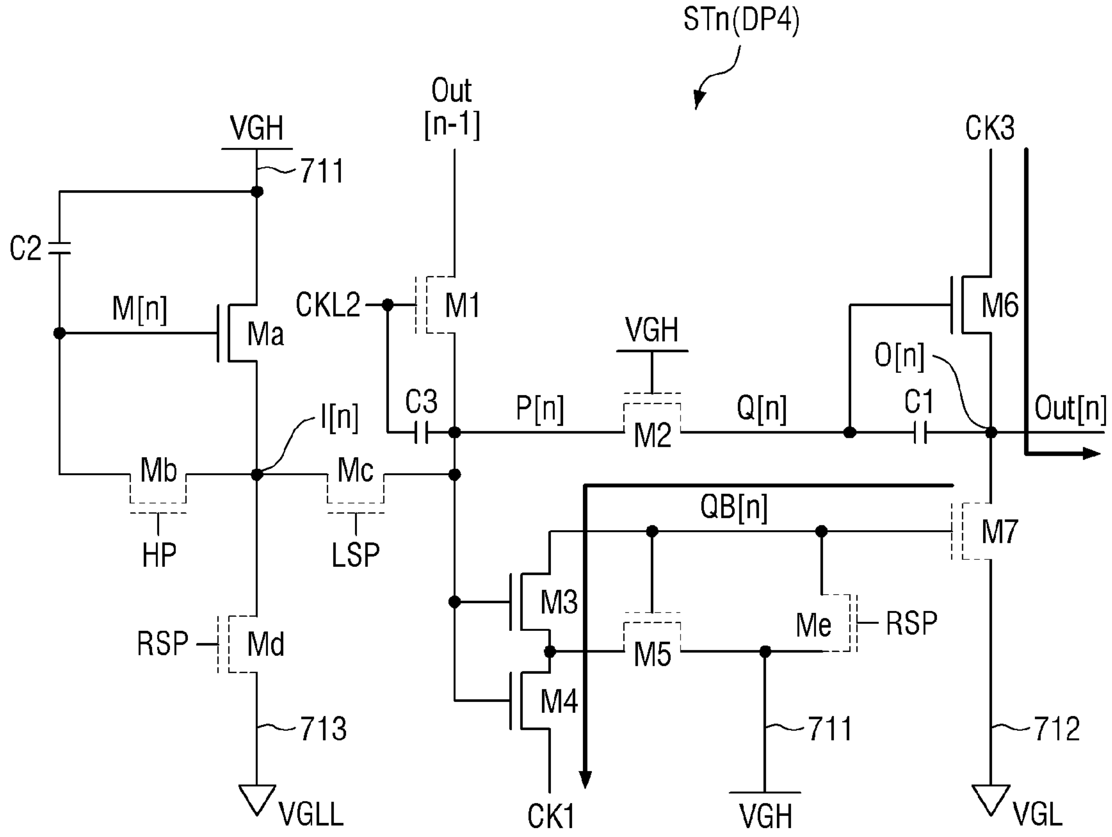
FIG. 10D is a circuit diagram illustrating an operation of an (n)th stage for a fourth sub-period of a display period according to some embodiments.

FIG. 10D is a circuit diagram illustrating an operation of the (n)th stage STn for a fourth sub-period DP4 of the display period DP. According to some embodiments, at the fourth sub-period DP4 of the display period DP, each state of transistors included in the (n)th stage STn may be listed as illustrated in Table 4.

TABLE 4

| Fourth sub-period DP4 of display period DP | |
|---|---|
| Transistor | State |
| First memory transistor Ma | On |
| Second memory transistor Mb | Off |
| Third memory transistor Mc | Off |
| Fourth memory transistor Md | Off |
| First transistor M1 | Off |
| Second transistor M2 | Off |
| Third transistor M3 | On |
| Fourth transistor M4 | On |
| Fifth transistor M5 | Off |
| Sixth transistor M6 | On |
| Seventh transistor M7 | Off |
| Eighth transistor Me | Off |

Referring to FIGS. 9 and 10*d* and Table 4, at the fourth sub-period DP4 of the display period DP, as the third normal clock CK3 may maintain the high potential voltage VGH. Therefore, the output node O[n] of the (n)th stage STn may maintain a high state. The operation of the third sub-period DP3 and the operation of the fourth sub-period DP4 may be substantially the same as each other based on the (n)th stage STn. At the fourth sub-period DP4 of the display period DP, the M node M[n] of the (n)th stage STn may maintain the high state.

Figure 10E:
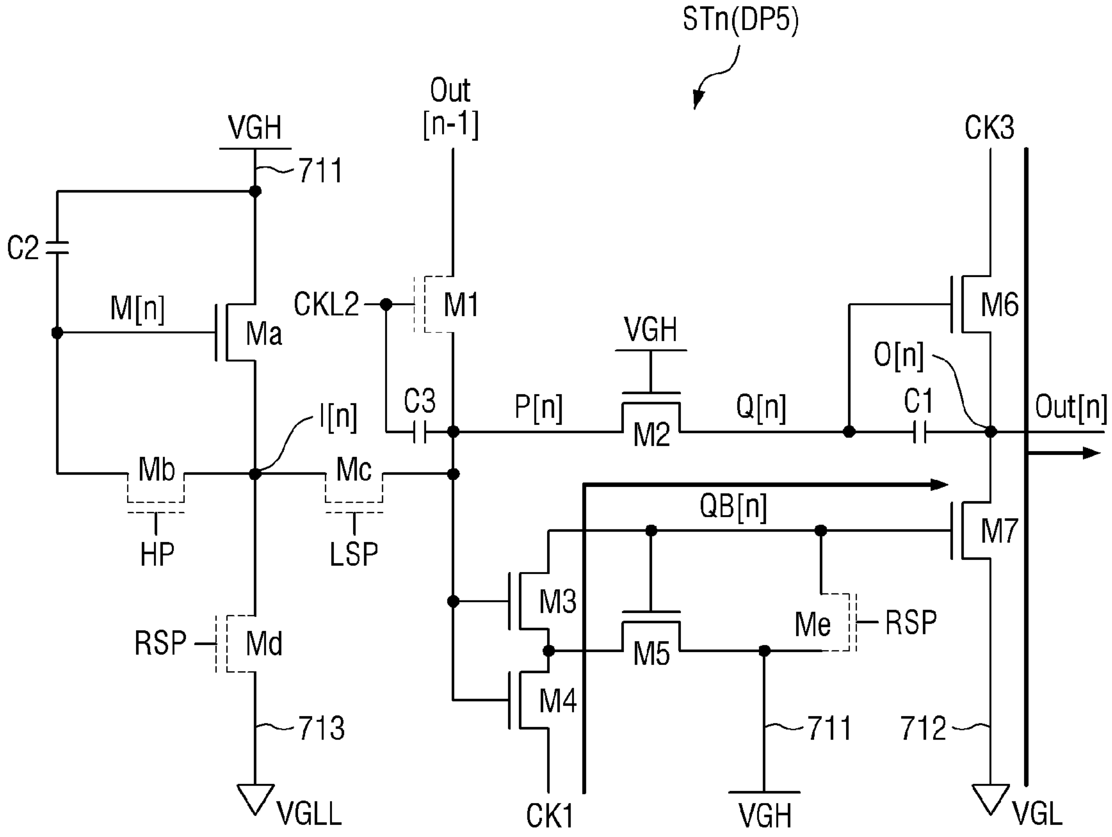
FIG. 10E is a circuit diagram illustrating an operation of an (n)th stage for a fifth sub-period of a display period according to some embodiments.

FIG. 10E is a circuit diagram illustrating an operation of the (n)th stage STn for a fifth sub-period DP5 of the display period DP. According to some embodiments, at the fifth sub-period DP5 of the display period DP, each state of transistors included in the (n)th stage STn may be listed as illustrated in Table 5.

TABLE 5

| Fifth sub-period DP5 of display period DP | |
|---|---|
| Transistor | State |
| First memory transistor Ma | On |
| Second memory transistor Mb | Off |
| Third memory transistor Mc | Off |
| Fourth memory transistor Md | Off |
| First transistor M1 | Off |
| Second transistor M2 | On |
| Third transistor M3 | On |
| Fourth transistor M4 | On |
| Fifth transistor M5 | On |
| Sixth transistor M6 | On |
| Seventh transistor M7 | On |
| Eighth transistor Me | Off |

Referring to FIGS. 9 and 10*e* and Table 5, at the fifth sub-period DP5 of the display period DP, as the third normal clock CK3 is shifted from the high potential voltage VGH to the first low voltage VGL, the output node O[n] of the (n)th stage STn may be shifted from the high state to the low state. At the fifth sub-period DP5 of the display period DP, the first normal clock CK1 may be shifted from the first low potential voltage VGL to the high potential voltage VGH. Therefore, the high potential voltage VGH may be supplied to the QB node QB[n] through the third transistor M3 and the fourth transistor M4, and the QB node QB[n] may be charged at the high state. The seventh transistor M7 is turned on as the QB node QB[n] is charged at the high state, and accordingly, the seventh transistor M7 may supply a low potential voltage to the output node O[n] of the (n)th stage STn.

Meanwhile, at the fifth sub-period DP5 of the display period DP, the M node M[n] of the (n)th stage STn may maintain the high state.

Figure 10F:
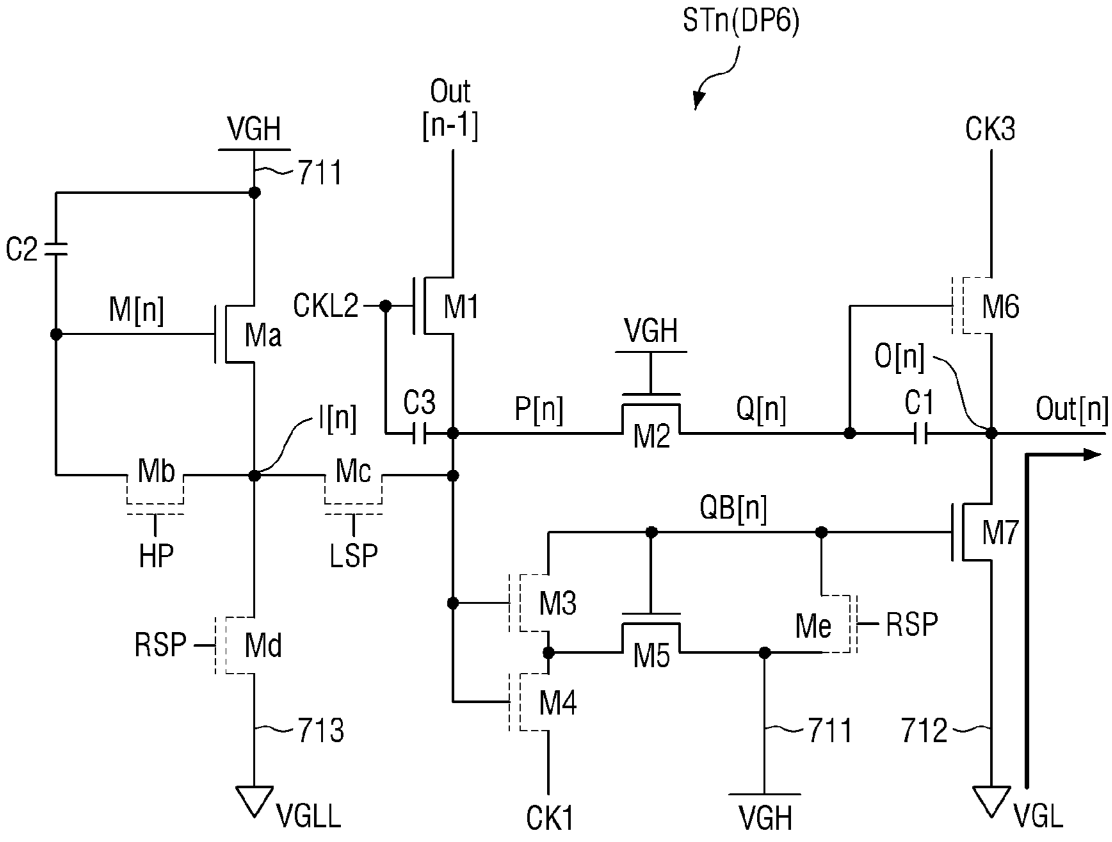
FIG. 10F is a circuit diagram illustrating an operation of an (n)th stage for a sixth sub-period of a display period according to some embodiments.

FIG. 10F is a circuit diagram illustrating an operation of the (n)th stage STn for a sixth sub-period DP6 of the display period DP. According to some embodiments, at the sixth sub-period DP6 of the display period DP, each state of transistors included in the (n)th stage STn may be listed as illustrated in Table 6.

TABLE 6

| Fifth sub-period DP6 of display period DP | |
|---|---|
| Transistor | State |
| First memory transistor Ma | On |
| Second memory transistor Mb | Off |
| Third memory transistor Mc | Off |
| Fourth memory transistor Md | Off |
| First transistor M1 | On |
| Second transistor M2 | On |
| Third transistor M3 | Off |
| Fourth transistor M4 | Off |
| Fifth transistor M5 | On |
| Sixth transistor M6 | Off |
| Seventh transistor M7 | On |
| Eighth transistor Me | Off |

Referring to FIGS. 9 and 10*f* and Table 6, at the sixth sub-period DP6 of the display period DP, the output node O[n] of the (n)th stage may maintain a low state as the seventh transistor M7 supplies a low potential voltage. At the sixth sub-period DP6 of the display period DP, the second low voltage clock CKL2 may be shifted from the second low potential voltage VGLL to the high potential voltage VGH. Therefore, the first transistor M1 may be turned on, and the turned-on first transistor M1 may supply the first low potential voltage VGL of a line, to which a carry signal is input, to the Q node Q[n]. Therefore, the Q node Q[n] may be changed to the low state.

Meanwhile, at the sixth sub-period DP6 of the display period DP, the M node M[n] of the (n)th stage may maintain the high state.

After the sixth sub-period DP6 of the display period DP, when the second low voltage clock CKL2 is shifted from the high potential voltage VGH to the second low potential voltage VGLL, the voltage level of the Q node Q[n] and the P node P[n] may be lowered to a voltage lower than the first low potential voltage VGL due to a coupling effect of the second capacitor C3. Therefore, after the sixth sub-period DP6 of the display period DP, even though the sixth transistor M6 has characteristics of a depletion mode, the sixth transistor M6 may be completely turned off. According to some embodiments of the present disclosure, the third normal clock CK3 may be prevented from being transferred to the output node O[n] through the sixth transistor M6 after the sixth sub-period DP6 of the display period DP.

Figure 11:
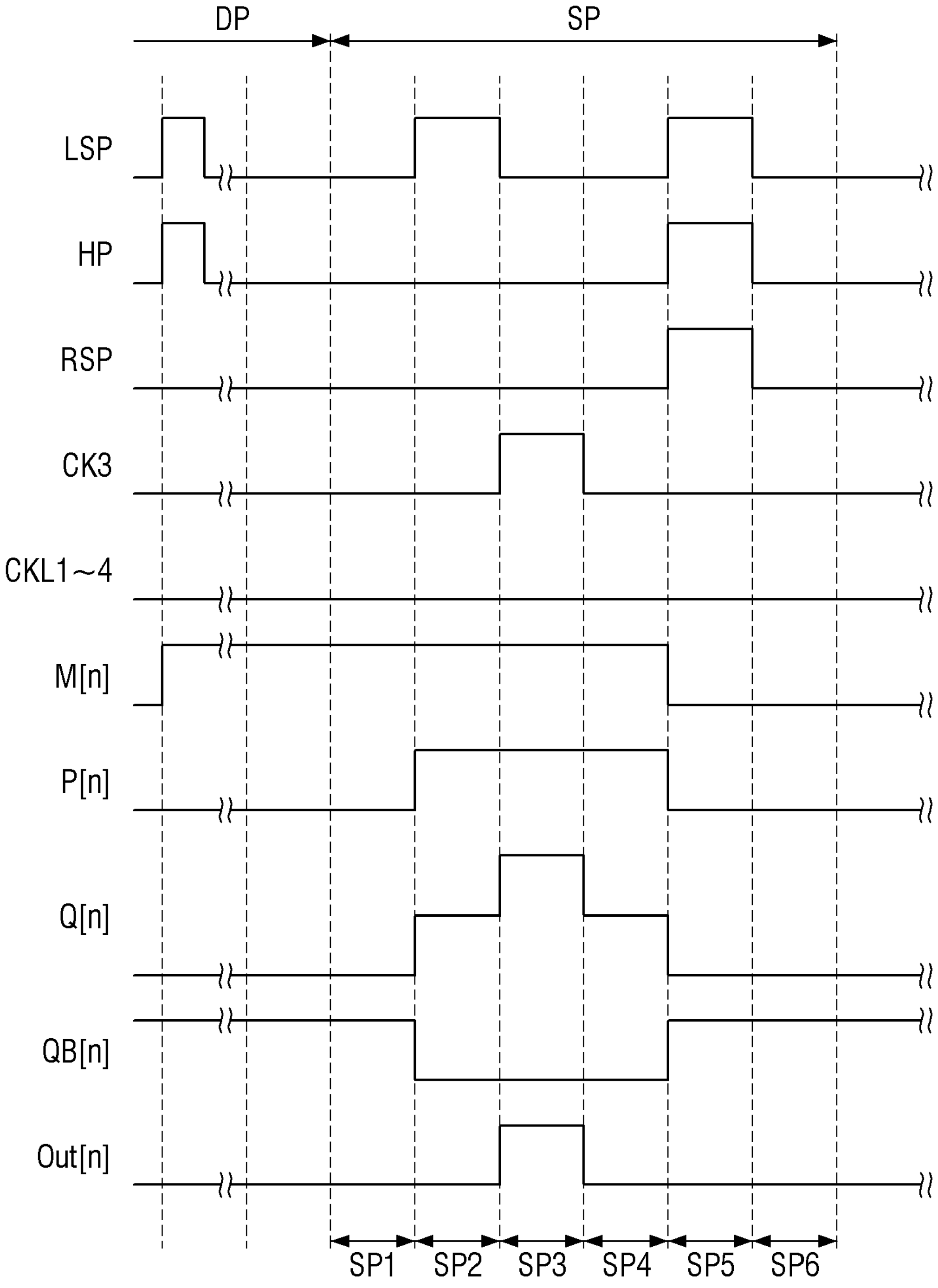
FIG. 11 is a signal waveform diagram illustrating a sensing period of a scan signal driver based on an (n)th stage according to some embodiments.

FIG. 11 is a signal waveform diagram illustrating a sensing period SP of a scan signal driver 200 based on an (n)th stage STn according to some embodiments.

In FIG. 11, a period SP1 represents a first sub-period SP1 of the sensing period SP based on the (n)th stage STn. This period will be described in more detail with reference to FIG. 12A.

In FIG. 11, a period SP2 represents a second sub-period SP2 of the sensing period SP based on the (n)th stage STn. This period will be described in more detail with reference to FIG. 12B.

In FIG. 11, a period SP3 represents a third sub-period SP3 of the sensing period SP based on the (n)th stage STn. This period will be described in more detail with reference to FIG. 12C.

In FIG. 11, a period SP4 represents a fourth sub-period SP4 of the sensing period SP based on the (n)th stage STn. This period will be described in more detail with reference to FIG. 12D.

In FIG. 11, a period SP5 represents a fifth sub-period SP5 of the sensing period SP based on the (n)th stage STn. This period will be described in more detail with reference to FIG. 12E.

In FIG. 11, a period SP6 represents a sixth sub-period SP6 of the sensing period SP based on the (n)th stage STn. This period will be described in more detail with reference to FIG. 12F.

At the sensing period SP, the plurality of low voltage clocks CKL may not be output. For example, first to fourth low voltage clocks are not output at the sensing period SP.

At the sensing period SP, any one of the plurality of normal clocks may be output only once. In the shown example, the third normal clock CK3 is output only once at the sensing period SP, but embodiments according to the present disclosure are not limited thereto.

Figure 12A:
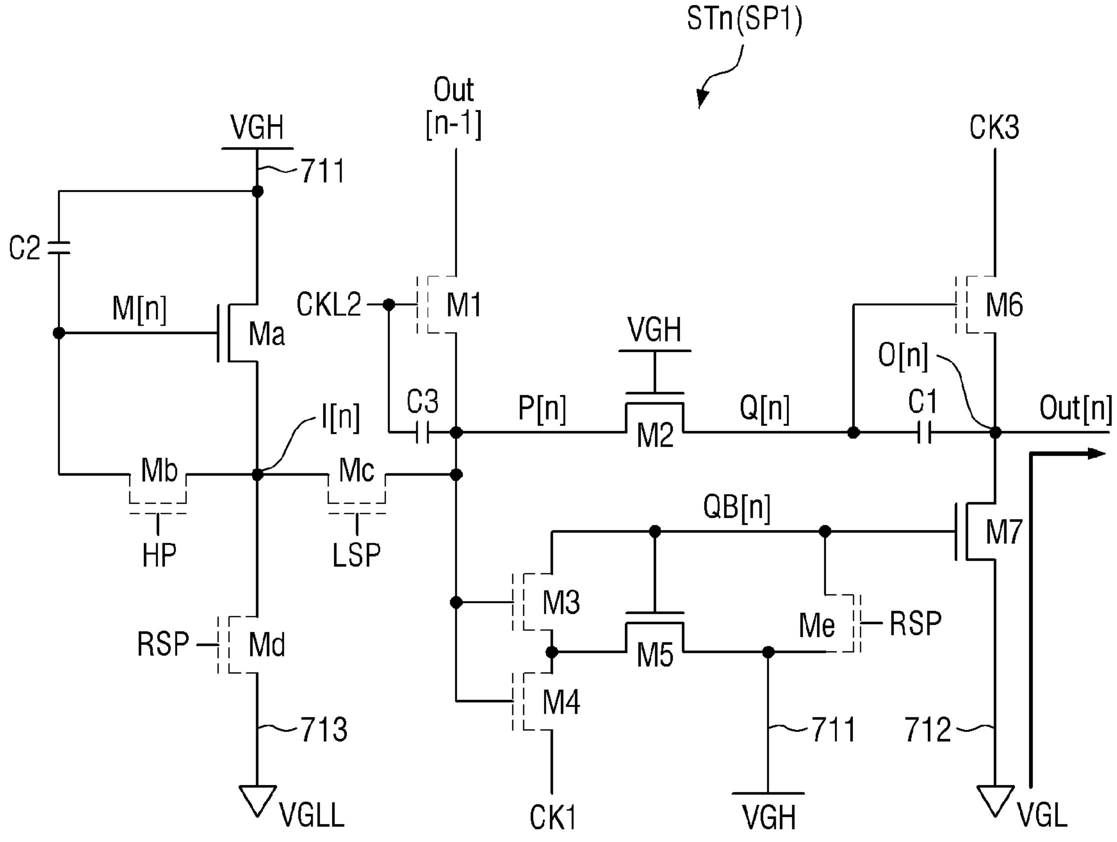
FIG. 12A is a circuit diagram illustrating an operation of an (n)th stage for a first sub-period of a sensing period according to some embodiments.

FIG. 12A is a circuit diagram illustrating an operation of an (n)th stage STn for a first sub-period SP1 of a sensing period SP. According to some embodiments, at the first sub-period SP1 of the sensing period SP, each state of transistors included in an (n)th stage STn may be listed as illustrated in Table 7.

TABLE 7

| First sub-period SP1 of sensing period SP | |
|---|---|
| Transistor | State |
| First memory transistor Ma | On |
| Second memory transistor Mb | Off |
| Third memory transistor Mc | Off |
| Fourth memory transistor Md | Off |
| First transistor M1 | Off |
| Second transistor M2 | On |
| Third transistor M3 | Off |
| Fourth transistor M4 | Off |
| Fifth transistor M5 | On |
| Sixth transistor M6 | Off |
| Seventh transistor M7 | On |
| Eighth transistor Me | Off |

Referring to FIGS. 11 and 12*a* and Table 7, at the first sub-period SP1 of the sensing period SP, the output node O[n] of the (n)th stage STn may maintain a low state as the seventh transistor M7 supplies a low potential voltage. Meanwhile, at the first sub-period SP1 of the sensing period SP, the M node M[n] of the (n)th stage STn may maintain a high state.

Figure 12B:
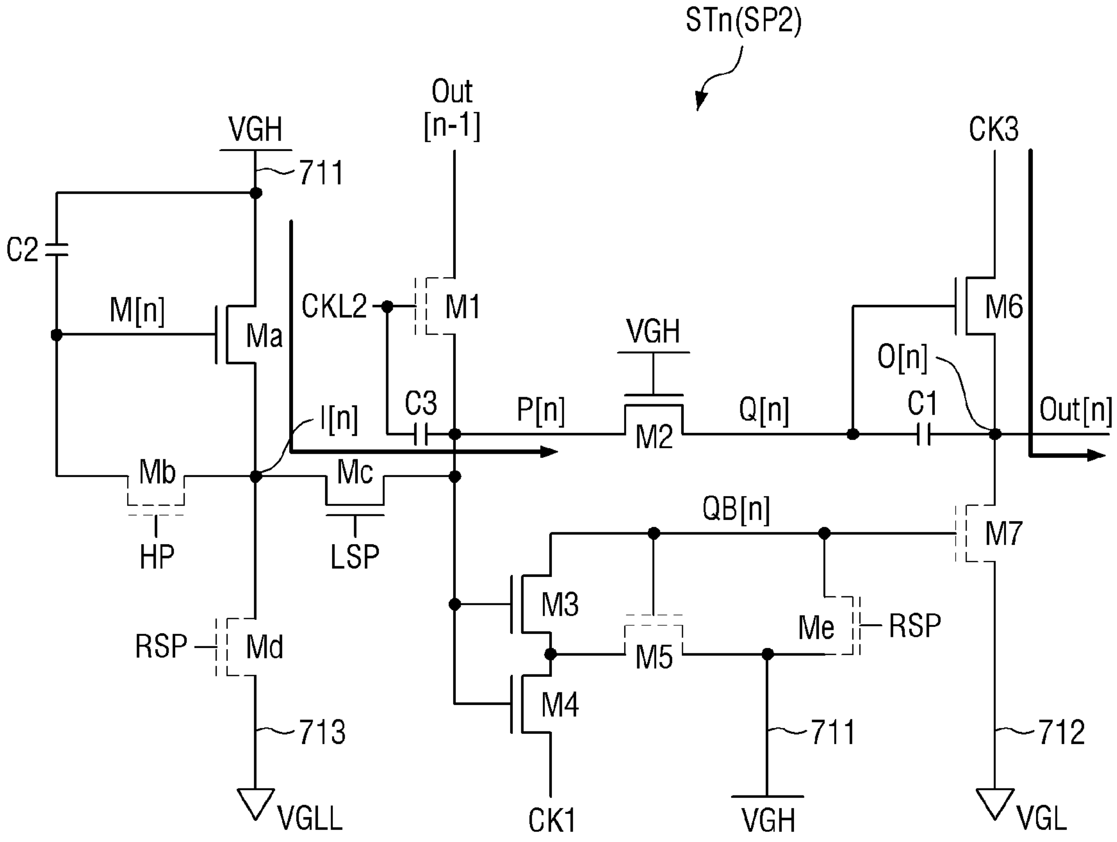
FIG. 12B is a circuit diagram illustrating an operation of an (n)th stage for a second sub-period of a sensing period according to some embodiments.

FIG. 12B is a circuit diagram illustrating an operation of an (n)th stage STn for a second sub-period SP2 of a sensing period SP. According to some embodiments, at the second sub-period SP2 of the sensing period SP, each state of the transistors included in the (n)th stage STn may be listed as illustrated in Table 8.

TABLE 8

| Second sub-period SP2 of sensing period SP | |
|---|---|
| Transistor | State |
| First memory transistor Ma | On |
| Second memory transistor Mb | Off |
| Third memory transistor Mc | On |
| Fourth memory transistor Md | Off |
| First transistor M1 | Off |
| Second transistor M2 | On |
| Third transistor M3 | On |
| Fourth transistor M4 | On |
| Fifth transistor M5 | Off |
| Sixth transistor M6 | On |
| Seventh transistor M7 | Off |
| Eighth transistor Me | Off |

Referring to FIGS. 11 and 12*b* and Table 8, at the second sub-period SP2 of the sensing period SP, the line selection signal LSP may be output. At the (n)th stage STn to which the line selection signal LSP is input, the third memory transistor Mc is turned on, and the supply line 711 of the high potential voltage VGH and the P node P[n] may be electrically connected to each other through the first memory transistor Ma and the third memory transistor Mc, which are turned on. Therefore, the P node P[n] and the Q node Q[n] may be shifted from a low state to a high state. Meanwhile, the line selection signal LSP is commonly (i.e., globally) input to the plurality of stages ST at the sensing period SP, but the M node M[n] maintains the high state at only some stages of the plurality of stages ST, so that only the P node P[n] and the Q node Q[n] of each of some stages may be charged at the high state. In this case, as described above with reference to FIG. 10C, some stages mean an (n−2)th stage STn−2 to an (n+1)th stage STn+1 in which the M node is charged at the high state at the third sub-period DP3 of the display period DP.

The third transistor M3 and the fourth transistor M4 may be turned on as the P node P[n] is charged. Therefore, the third transistor M3 and the fourth transistor M4 electrically connect a supply line of the third normal clock CK3 maintaining the first low potential voltage VGL to the QB node QB[n] at the sensing period SP, and thus the QB node QB[n] may be shifted to the low state. The seventh transistor M7 may be turned off as the QB node QB[n] is shifted to the low state.

Figure 12C:
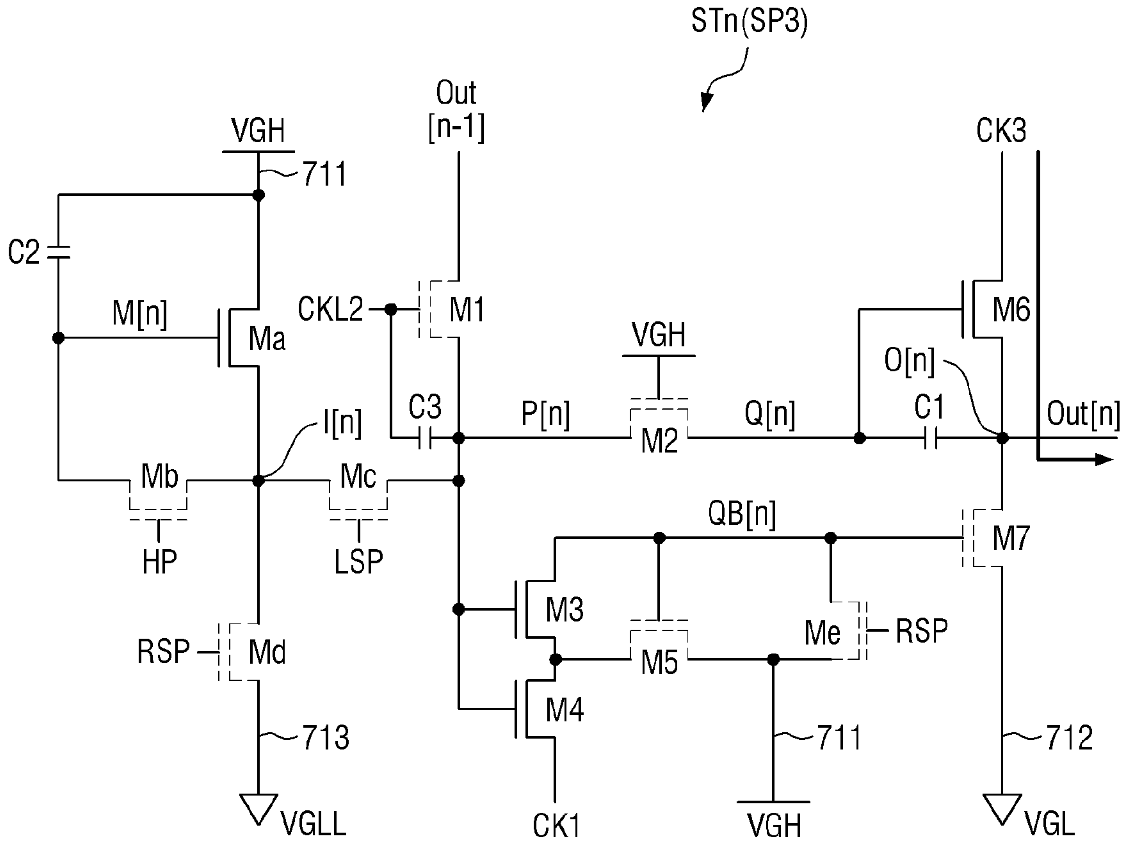
FIG. 12C is a circuit diagram illustrating an operation of an (n)th stage for a third sub-period of a sensing period according to some embodiments.

FIG. 12C is a circuit diagram illustrating an operation of an (n)th stage STn for a third sub-period SP3 of a sensing period SP. According to some embodiments, at the third sub-period SP3 of the sensing period SP, each state of the transistors included in the (n)th stage STn may be listed as illustrated in Table 9.

TABLE 9

| Third sub-period SP3 of sensing period SP | |
|---|---|
| Transistor | State |
| First memory transistor Ma | On |
| Second memory transistor Mb | Off |
| Third memory transistor Mc | Off |
| Fourth memory transistor Md | Off |
| First transistor M1 | Off |
| Second transistor M2 | Off |
| Third transistor M3 | On |
| Fourth transistor M4 | On |
| Fifth transistor M5 | Off |
| Sixth transistor M6 | On |
| Seventh transistor M7 | Off |
| Eighth transistor Me | Off |

Figure 12D:
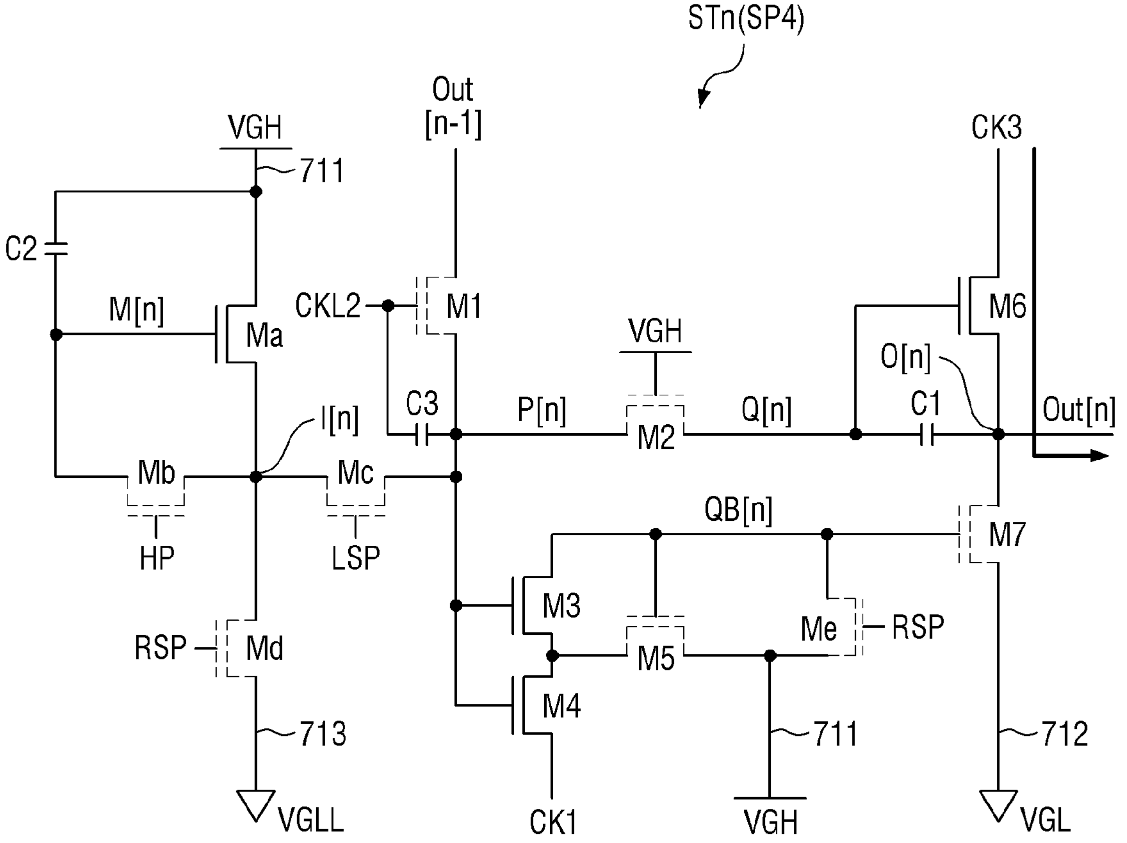
FIG. 12D is a circuit diagram illustrating an operation of an (n)th stage for a fourth sub-period of a sensing period according to some embodiments.
Figure 12E:
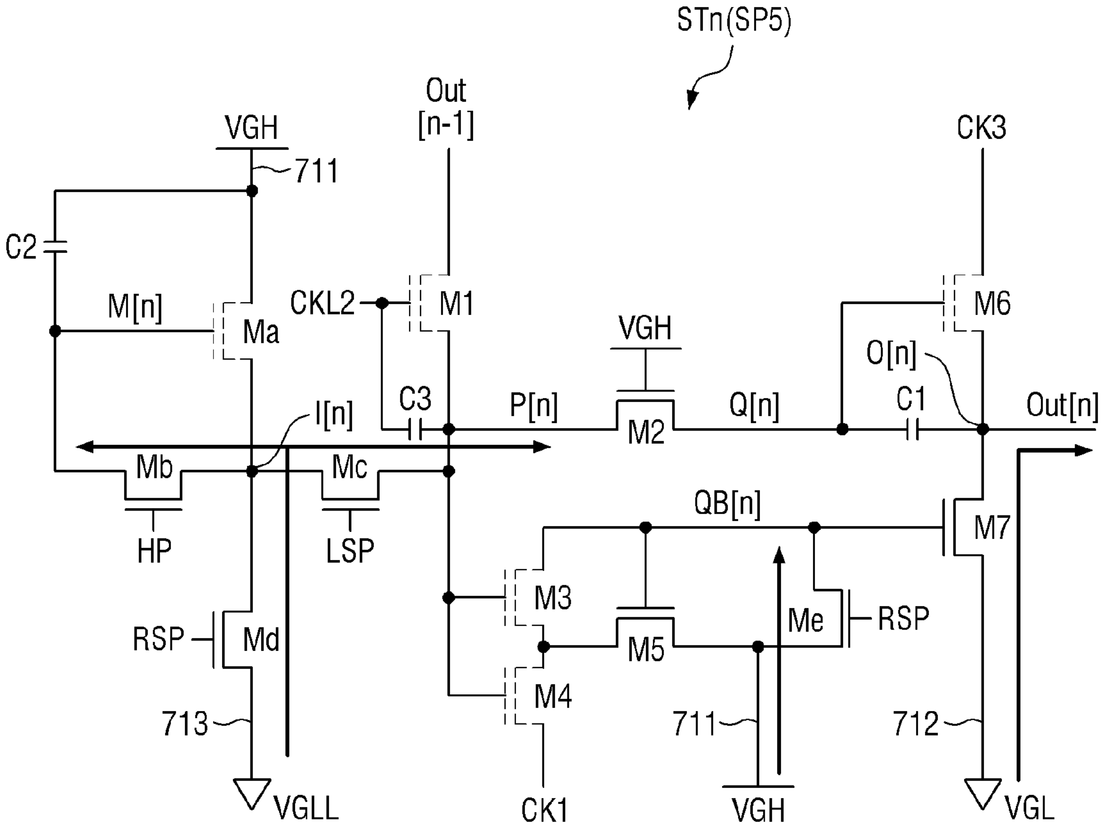
FIG. 12E is a circuit diagram illustrating an operation of an (n)th stage for a fifth sub-period of a sensing period according to some embodiments.

Referring to FIGS. 11 and 12*e* and Table 9, at the third sub-period SP3 of the sensing period SP, as the third normal clock CK3 is shifted from the first low potential voltage VGL to the high potential voltage VGH, the Q node Q[n] of the (n)th stage STn may be bootstrapped to become a second voltage level V2 higher than the first voltage level V1. Therefore, the output node O[n] of the (n)th stage STn is shifted from a low state to a high state, and the (n)th stage STn may output the sensing signal. Meanwhile, the other stages in which the M node M[n] is charged at the high state at the third sub-period DP3 of the display period DP, that is, the (n−2)th stage STn−2, the (n−1)th stage STn−1 and the (n+1)th stage STn+1 may not output the sensing signal. This is because that the sixth transistor M6 of each of the (n−2)th stage STn−2, the (n−1)th stage STn−1 and the (n+1)th stage STn+1 receives the first normal clock CK1, the second normal clock CK2 and the fourth normal clock CK4, which maintain the first low potential voltage VGL during the sensing period SP.

FIG. 12D is a circuit diagram illustrating an operation of an (n)th stage STn for a fourth sub-period SP4 of a sensing period SP. According to some embodiments, at the fourth sub-period SP4 of the sensing period SP, each state of the transistors included in the (n)th stage STn may be listed as illustrated in Table 10.

TABLE 10

| Fourth sub-period SP4 of sensing period SP | |
|---|---|
| Transistor | State |
| First memory transistor Ma | On |
| Second memory transistor Mb | Off |
| Third memory transistor Mc | Off |
| Fourth memory transistor Md | Off |
| First transistor M1 | Off |
| Second transistor M2 | Off |
| Third transistor M3 | On |
| Fourth transistor M4 | On |
| Fifth transistor M5 | Off |
| Sixth transistor M6 | On |
| Seventh transistor M7 | Off |
| Eighth transistor Me | Off |

Referring to FIGS. 11 and 12*d* and Table 10, at the fourth sub-period SP4 of the sensing period SP, the output node O[n] of the (n)th stage STn may be shifted to a low state as the third normal clock CK3 is shifted to the first low potential voltage VGL. At this time, the P node P[n] and the Q node Q[n] may maintain a high state, and the QB node QB[n] may maintain a low state. FIG. 12E is a circuit diagram illustrating an operation of the (n)th stage ST[n] for the fifth sub-period SP5 of the sensing period SP. According to some embodiments, at the fifth sub-period SP5 of the sensing period SP, each state of the transistors included in the (n)th stage STn may be listed as illustrated in Table 11.

TABLE 11

| Fifth sub-period SP5 of sensing period SP | |
|---|---|
| Transistor | State |
| First memory transistor Ma | Off |
| Second memory transistor Mb | On |
| Third memory transistor Mc | On |
| Fourth memory transistor Md | On |
| First transistor M1 | Off |
| Second transistor M2 | On |
| Third transistor M3 | Off |
| Fourth transistor M4 | Off |
| Fifth transistor M5 | On |
| Sixth transistor M6 | Off |
| Seventh transistor M7 | On |
| Eighth transistor Me | On |

Referring to FIGS. 11, 12*e* and Table 11, at the fifth sub-period SP5 of the sensing period SP, the line selection signal LSP, the holding signal HP and the reset control signal RSP may be output. In the (n)th stage STn to which the line selection signal LSP, the holding signal HP and the reset control signal RSP are input, the second memory transistor Mb, the third memory transistor Mc and the fourth memory transistor Md may be turned on to initialize the memory control circuit 702 and initialize the P node P[n] and the Q node Q[n] to the second low potential voltage VGLL. The eighth transistor Me may be turned on in response to the reset control signal RSP to charge the QB node QB[n] to a high state. The seventh transistor M7 may be turned on as the QB node QB[n] is charged at a high state, and may supply the low potential voltage to the output node O[n] of the n th stage STn.

Figure 12F:
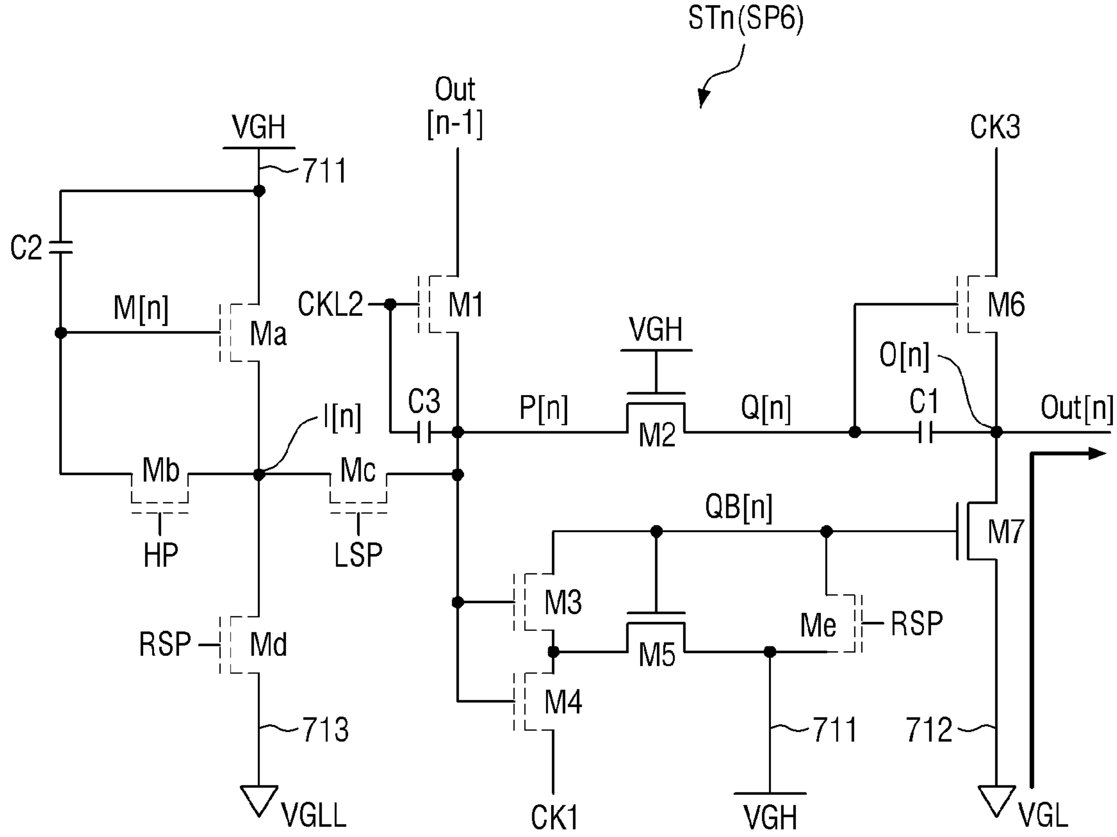
FIG. 12F is a circuit diagram illustrating an operation of an (n)th stage for a sixth sub-period of a sensing period according to some embodiments.

FIG. 12F is a circuit diagram illustrating an operation of the (n)th stage ST[n] for the sixth sub-period SP6 of the sensing period SP. According to some embodiments, at the sixth sub-period SP6 of the sensing period SP, each state of the transistors included in the (n)th stage STn may be listed as illustrated in Table 12.

TABLE 12

| Sixth sub-period SP6 of sensing period SP | |
|---|---|
| Transistor | State |
| First memory transistor Ma | Off |
| Second memory transistor Mb | Off |
| Third memory transistor Mc | Off |
| Fourth memory transistor Md | Off |
| First transistor M1 | Off |
| Second transistor M2 | On |
| Third transistor M3 | Off |
| Fourth transistor M4 | Off |
| Fifth transistor M5 | On |
| Sixth transistor M6 | Off |
| Seventh transistor M7 | On |
| Eighth transistor Me | Off |

Referring to FIGS. 11 and 12*f* and Table 12, at the sixth sub-period SP6 of the sensing period SP, the output node O[n] of the (n)th stage STn may maintain a low state as the QB node QB[n] maintains a high state. Meanwhile, at the sixth sub-period SP6 of the sensing period SP, the P node P[n], the Q node Q[n] and the (M) node M[n] may maintain the low state.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments according to the present invention.

In concluding the detailed description, those skilled in the art will appreciate that many variations and modifications can be made to the example embodiments without substantially departing from the spirit and scope of embodiments according to the present invention. Therefore, the disclosed embodiments of the invention are used in a generic and descriptive sense only and not for purposes of limitation.

What is claimed is:

1. A scan signal driver comprising:

a plurality of stages configured to be driven by dividing a first frame period into a display period and a sensing period, and to sequentially output scan signals at the display period, wherein each of the plurality of stages comprises:

an output control circuit configured to control a Q node and a QB node; and a memory control circuit configured to control an M node, wherein the scan signal driver is configured to:

irregularly set a specific stage of the plurality of stages at the display period every frame;

control the specific stage to store a voltage, which is charged in the Q node, in the M node by using the memory control circuit based on the specific stage outputting a scan signal; and control the specific stage to output a sensing signal by using the voltage stored in the M node at the sensing period subsequent to the display period, and the memory control circuit included in each of the plurality of stages includes:

a first memory transistor configured to supply a high potential voltage to an I node based on a voltage level of the M node;

a second memory transistor configured to electrically connect the M node with the I node based on a holding signal input from outside;

a third memory transistor configured to electrically connect the output control circuit with the I node based on a line selection signal input from the outside; and a fourth memory transistor configured to supply a second low potential voltage lower than a first low potential voltage to the I node based on a reset control signal input from the outside; and a memory capacitor between the M node and a supply line of the high potential voltage.

2. The scan signal driver of claim 1, wherein each of the plurality of stages is configured to:

receive the high potential voltage, the first low potential voltage lower than the high potential voltage, and the second low potential voltage lower than the first low potential voltage as driving voltages;

receive a scan signal output from a stage prior to the specific stage as a carry signal, and receive a pair of normal clocks of a plurality of normal clocks which are output by being phase-delayed as much as a designated period, any one of a plurality of low voltage clocks which are output by being phase-delayed as much as the designated period, the holding signal, the line selection signal and the reset control signal as control signals, the plurality of normal clocks are signals swinging between the high potential voltage and the first low potential voltage, and the plurality of low voltage clocks are signals swinging between the high potential voltage and the second low potential voltage.

3. The scan signal driver of claim 2, wherein the specific stage is an (n)th stage among the plurality of stages, the output control circuit included in the specific stage includes:

a first transistor configured to supply the carry signal to a P node based on an input of a second low voltage clock;

a second transistor including a gate connected to the supply line of the high potential voltage and configured to connect the P node with the Q node;

third and fourth transistors configured to supply a first normal clock to the QB node based on a voltage level of the P node;

a fifth transistor configured to supply the high potential voltage to a node between the third transistor and the fourth transistor, which are connected in series, based on a voltage level of the QB node;

a sixth transistor configured to supply a third normal clock, which is phase-inverted with the first normal clock, to an output node of the specific stage based on a voltage level of the Q node;

a seventh transistor configured to supply the first low potential voltage to the output node based on the voltage level of the QB node;

an eighth transistor configured to supply the high potential voltage to the QB node based on an input of the reset control signal;

a first capacitor between the Q node and the output node; and a second capacitor between a gate of the first transistor and the P node.

4. The scan signal driver of claim 3, wherein the third memory transistor of the memory control circuit is configured to electrically connect the I node with the P node based on an input of the line selection signal.

5. The scan signal driver of claim 4, wherein the line selection signal and the holding signal are configured to be output at an irregular timing of the display period every frame to select the specific stage of the plurality of stages.

6. The scan signal driver of claim 5, wherein, at the display period, the specific stage is configured to supply a voltage, which is charged in the Q node and the P node, to the M node through the third memory transistor turned on by the line selection signal and the second memory transistor turned on by the holding signal, and to maintain the voltage of the M node until the sensing period by turning off the second memory transistor and the third memory transistor after the M node is charged.

7. The scan signal driver of claim 6, wherein, at the sensing period, the specific stage is configured to supply the high potential voltage to the I node through the first memory transistor configured to be turned on by the voltage of the charged M node, and to charge the P node and the Q node by using a high potential voltage supplied to the I node through the third memory transistor based on the third memory transistor being turned on by the line selection signal.

8. The scan signal driver of claim 7, wherein, at the sensing period, the specific stage is configured to output the sensing signal through the output node in synchronization with a timing at which the third normal clock is shifted from the first low potential voltage to the high potential voltage after the P node and the Q node are charged.

9. The scan signal driver of claim 8, wherein, at the sensing period, the specific stage is configured to be initialized by receiving the line selection signal, the holding signal and the reset control signal after outputting the sensing signal through the output node.

10. The scan signal driver of claim 1, wherein a supply line of the line selection signal is commonly connected to the plurality of stages, a supply line of the holding signal is commonly connected to the plurality of stages, and a supply line of the reset control signal is commonly connected to the plurality of stages.

11. A display device comprising:

a display panel including a plurality of scan signal lines and a plurality of data lines; and a scan signal driver configured to drive the plurality of scan signal lines, wherein the scan signal driver includes a plurality of stages configured to be driven by dividing a first frame period into a display period and a sensing period, and to sequentially output scan signals at the display period, each of the plurality of stages includes an output control circuit configured to control a Q node and a QB node, and a memory control circuit configured to control an M node, wherein the scan signal driver is configured to:

irregularly set a specific stage from among the plurality of stages at the display period every frame;

control the specific stage to store a voltage, which is charged in the Q node, in the M node by using the memory control circuit based on the specific stage outputting a scan signal; and control the specific stage to output a sensing signal by using the voltage stored in the M node at the sensing period subsequent to the display period, and the memory control circuit included in each of the plurality of stages includes:

a first memory transistor configured to supply a high potential voltage to an I node based on a voltage level of the M node;

a second memory transistor configured to electrically connect the M node with the I node based on a holding signal input from the outside;

a third memory transistor configured to electrically connect the output control circuit with the I node based on a line selection signal input from the outside; and a fourth memory transistor configured to supply a second low potential voltage lower than a first low potential voltage to the I node based on a reset control signal input from the outside; and a memory capacitor between the M node and a supply line of the high potential voltage.

12. The display device of claim 11, wherein each of the plurality of stages is configured to:

receive the high potential voltage, the first low potential voltage lower than the high potential voltage and the second low potential voltage lower than the first low potential voltage as driving voltages;

receive a scan signal output from a stage prior to the specific stage as a carry signal; and receive a pair of normal clocks of a plurality of normal clocks which are output by being phase-delayed as much as a designated period, any one of a plurality of low voltage clocks which are output by being phase-delayed as much as the designated period, the holding signal, the line selection signal and the reset control signal as control signals, the plurality of normal clocks are signals swinging between the high potential voltage and the first low potential voltage, and the plurality of low voltage clocks are signals swinging between the high potential voltage and the second low potential voltage.

13. The display device of claim 12, wherein the specific stage is an (n)th stage among the plurality of stages, the output control circuit included in the specific stage comprises:

a first transistor configured to supply the carry signal to a P node based on an input of a second low voltage clock;

a second transistor including a gate connected to the supply line of the high potential voltage and configured to connect the P node with the Q node;

third and fourth transistors configured to supply a first normal clock to the QB node based on a voltage level of the P node;

a fifth transistor configured to supply the high potential voltage to a node between the third transistor and the fourth transistor, which are connected in series, based on a voltage level of the QB node;

a sixth transistor configured to supply a third normal clock, which is phase-inverted with the first normal clock, to an output node of the specific stage based on a voltage level of the Q node;

a seventh transistor configured to supply the first low potential voltage to the output node based on the voltage level of the QB node;

an eighth transistor configured to supply the high potential voltage to the QB node based on an input of the reset control signal;

a first capacitor between the Q node and the output node; and a second capacitor between a gate of the first transistor and the P node.

14. The display device of claim 13, wherein the third memory transistor of the memory control circuit is configured to electrically connect the I node with the P node based on an input of the line selection signal.

15. The display device of claim 14, wherein the line selection signal and the holding signal are output at an irregular timing of the display period every frame to select the specific stage of the plurality of stages.

16. The display device of claim 15, wherein, at the display period, the specific stage is configured to supply a voltage, which is charged in the Q node and the P node, to the M node through the third memory transistor configured to be turned on by the line selection signal and the second memory transistor configured to be turned on by the holding signal, and to maintains the voltage of the M node until the sensing period by turning off the second memory transistor and the third memory transistor after the M node is charged.

17. The display device of claim 16, wherein, at the sensing period, the specific stage is configured to supply the high potential voltage to the I node through the first memory transistor configured to be turned on by the voltage of the charged M node, and to charges the P node and the Q node by using a high potential voltage supplied to the I node through the third memory transistor based on the third memory transistor being turned on by the line selection signal.

18. The display device of claim 17, wherein, at the sensing period, the specific stage is configured to output the sensing signal through the output node in synchronization with a timing at which the third normal clock is shifted from the first low potential voltage to the high potential voltage after the P node and the Q node are charged.

19. The display device of claim 18, wherein, at the sensing period, the specific stage is configured to be initialized by receiving the line selection signal, the holding signal and the reset control signal after outputting the sensing signal through the output node.

20. The display device of claim 19, wherein a supply line of the line selection signal is commonly connected to the plurality of stages, a supply line of the holding signal is commonly connected to the plurality of stages, and a supply line of the reset control signal is commonly connected to the plurality of stages.

* * * * *